(12) United States Patent
Mengwasser

(10) Patent No.: US 9,088,777 B2
(45) Date of Patent: Jul. 21, 2015

(54) METHODS AND SYSTEMS FOR PROCESSING STEREOSCOPIC VIDEO DATA

(75) Inventor: Brian Mengwasser, Princeton, NJ (US)

(73) Assignee: SES Americom, Inc., Princeton, NJ (US)

( * ) Notice: Subject to any disclaimer, the term of this patent is extended or adjusted under 35 U.S.C. 154(b) by 1036 days.

(21) Appl. No.: 13/082,037

(22) Filed: Apr. 7, 2011

(65) Prior Publication Data

US 2012/0257011 A1    Oct. 11, 2012

(51) Int. Cl.
*H04N 15/00* (2006.01)
*H04N 13/00* (2006.01)
*H04N 19/597* (2014.01)

(52) U.S. Cl.
CPC ......... *H04N 13/0048* (2013.01); *H04N 19/597* (2014.11)

(58) Field of Classification Search
CPC .................... H04N 13/0048; H04N 19/00769
USPC ....................... 348/E13.026, E13.068, 43, 51
See application file for complete search history.

(56) References Cited

U.S. PATENT DOCUMENTS

| | | | |
|---|---|---|---|
| 6,111,598 A * | 8/2000 | Faris | 348/57 |
| 2004/0036763 A1* | 2/2004 | Swift et al. | 348/51 |

OTHER PUBLICATIONS

SatMagazine, vol. 4, No. 1, Mar. 2011, pp. 1, 4, 6, 8 and 10-12 http://www.satmagazine.com/2011/SM_Mar_2011.pdf.
Andrew Woods, "3-D Displays in the Home", Information Display 7/09; pp. 8-12.
William Zou, "An Overview for Developing End-to-End Standards for 3-D TV in the Home", Information Display 7/09; pp. 14-19.
OpenCable Specifications, Content Encoding Profiles 3.0 Specification, OC-SP-CEP3.0-I01-100827, Aug. 27, 2010; pp. i-iv and 1-34.

* cited by examiner

*Primary Examiner* — Sath V Perungavoor
*Assistant Examiner* — Dakshesh Parikh
(74) *Attorney, Agent, or Firm* — Wolf, Greenfield & Sacks, P.C.

(57) ABSTRACT

Methods and systems are disclosed for processing stereoscopic video data for transmission into a single frame or field, including multiplexing color data for left-eye and right-eye image into a single frame or field in a spatially incongruous manner. Embodiments of the invention also relate to methods and systems for processing such a single frame or field and displaying the corresponding stereoscopic video data either on a passive monitor or on an active monitor, to render three-dimensional (3D) video content. The invention also relates to corresponding computer programs and signals.

35 Claims, 32 Drawing Sheets

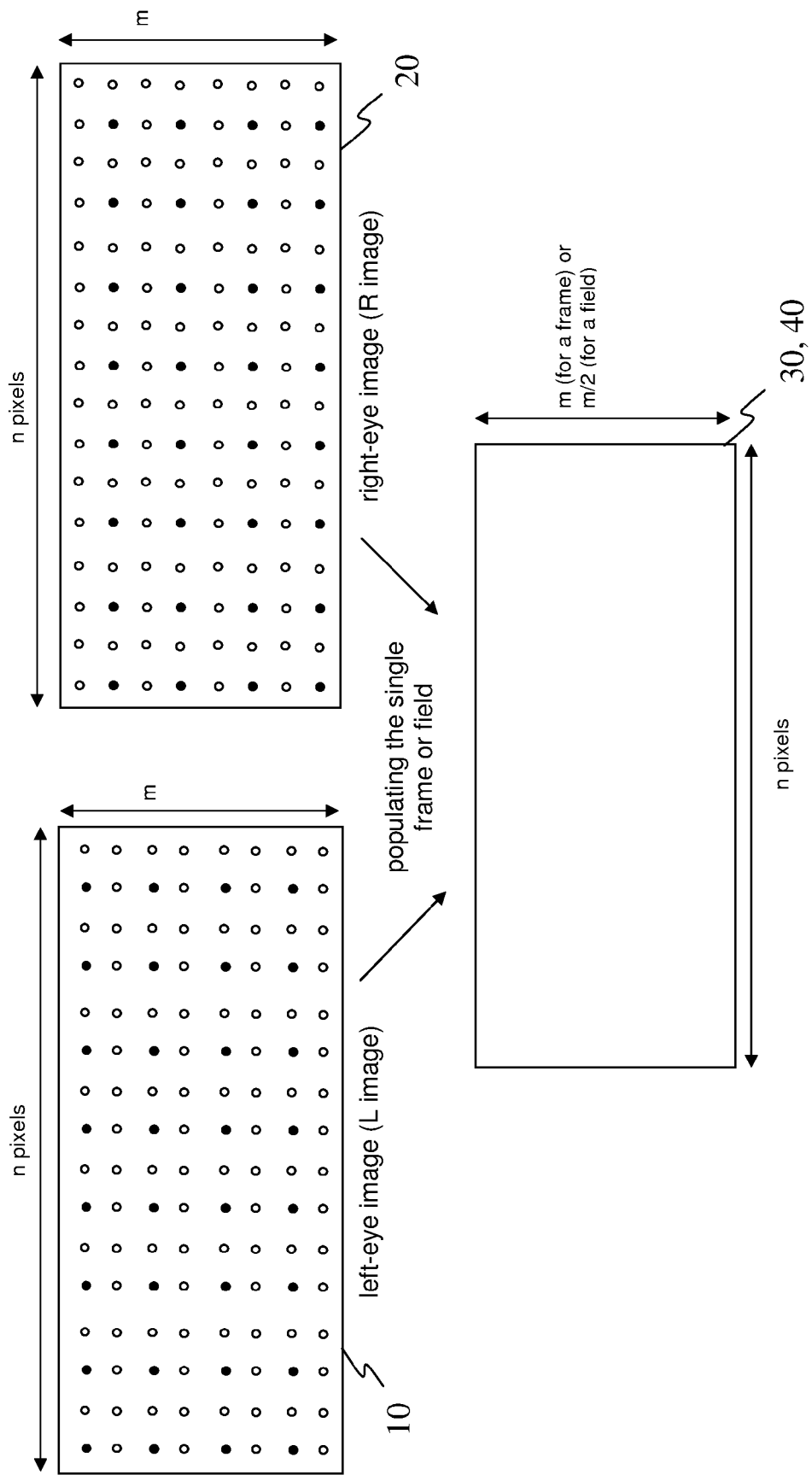

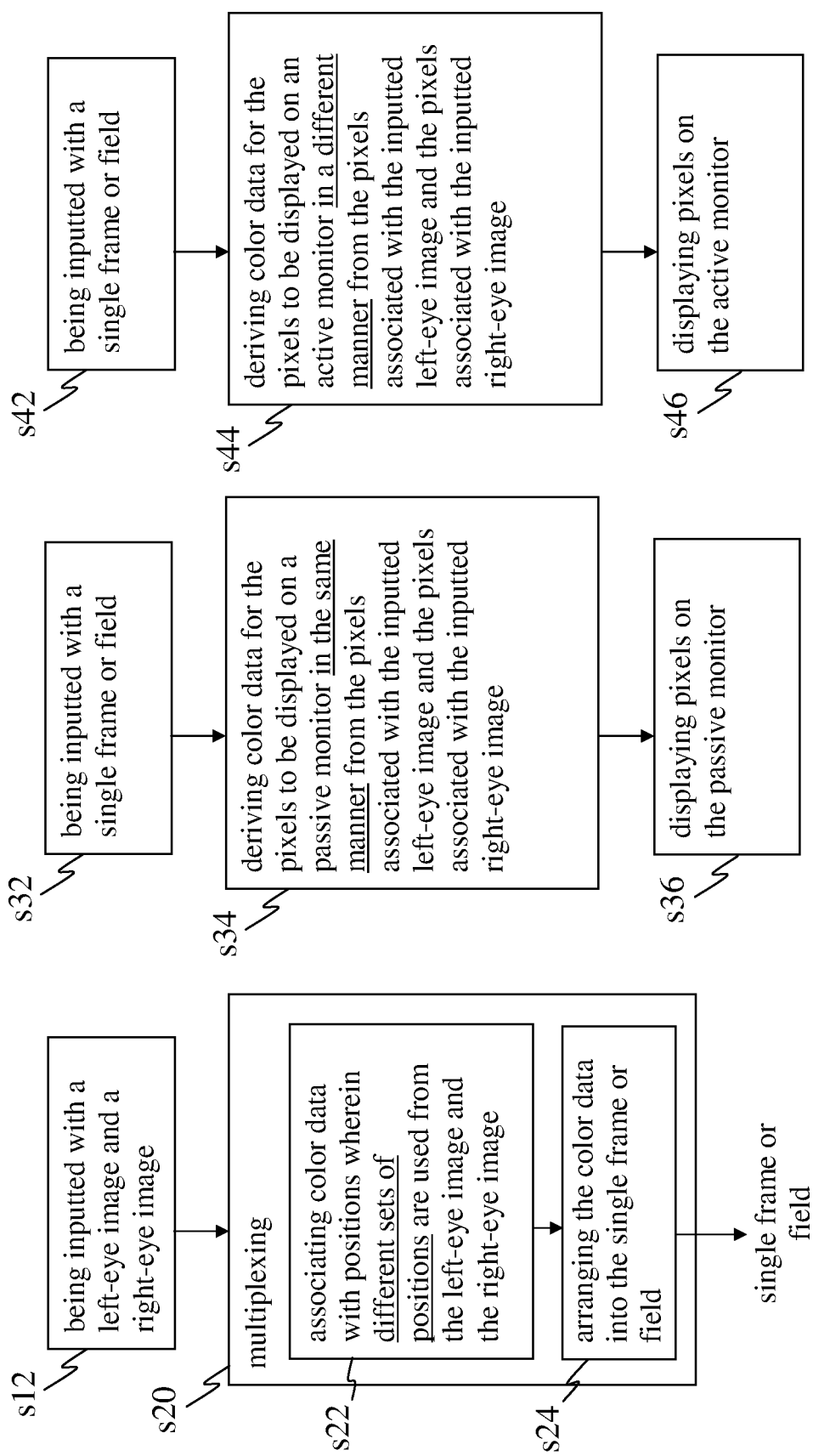

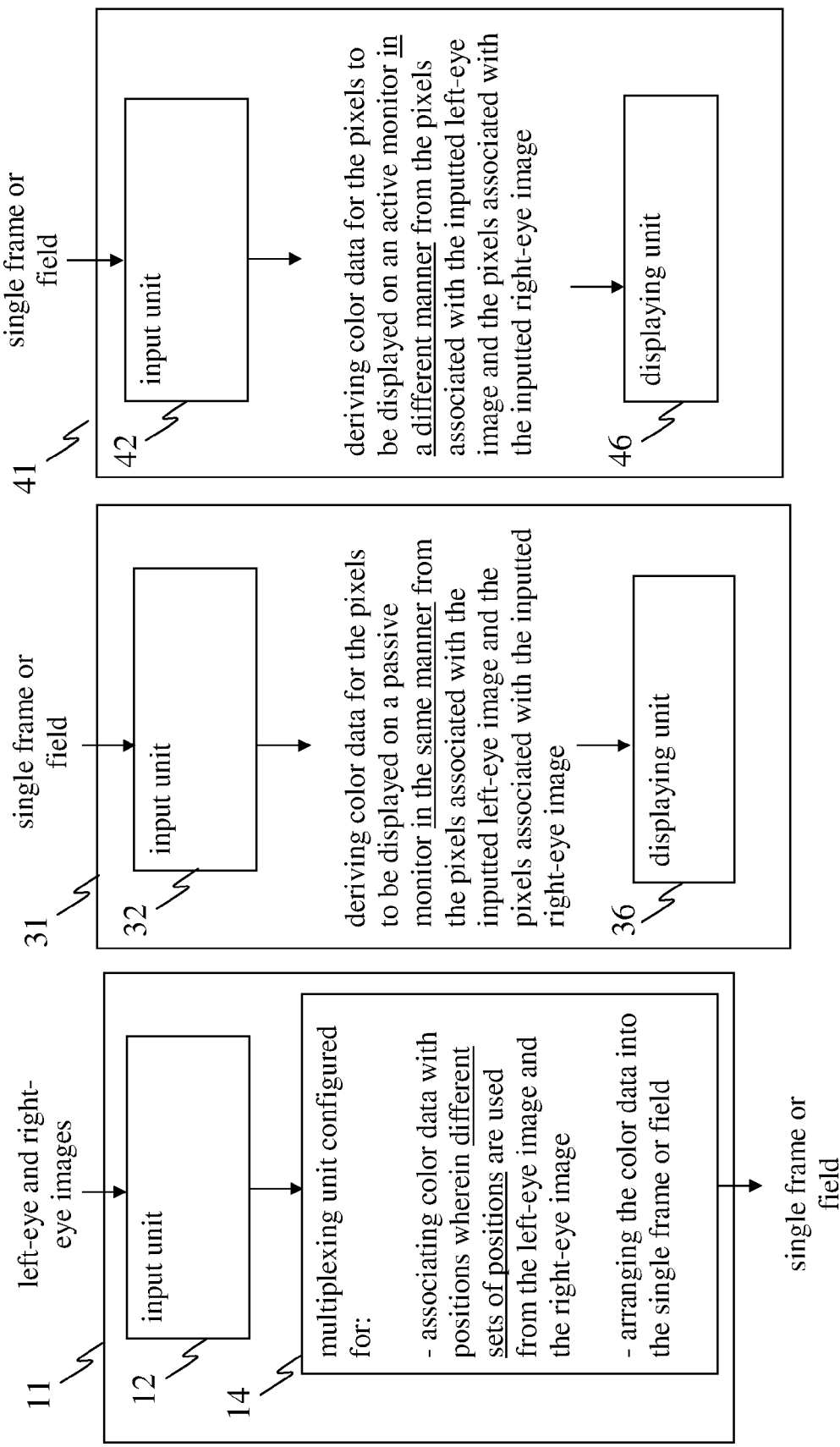

**LERO Passive Monitor
Processing in one
embodiment of the invention**

*Expansion and De-interlace*

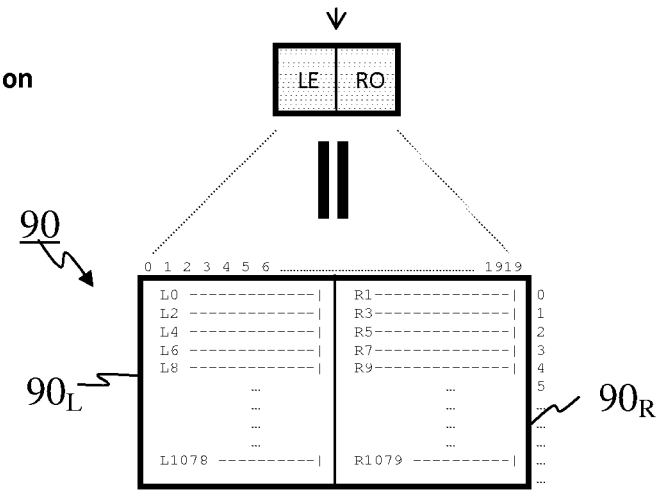

90

90$_L$  90$_R$

Interlaced signal
received by
monitor

De-Multiplex
*Split into Left and
Right Streams*

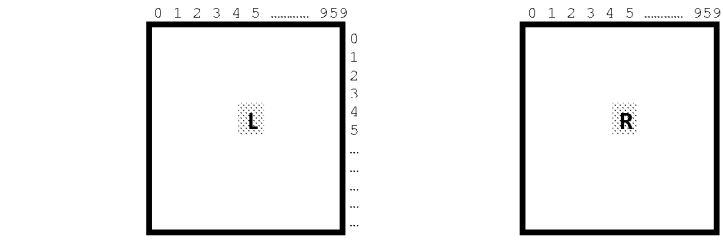

Expansion
*Horizontal
Interpolation
960 - -> 1920 cols.*

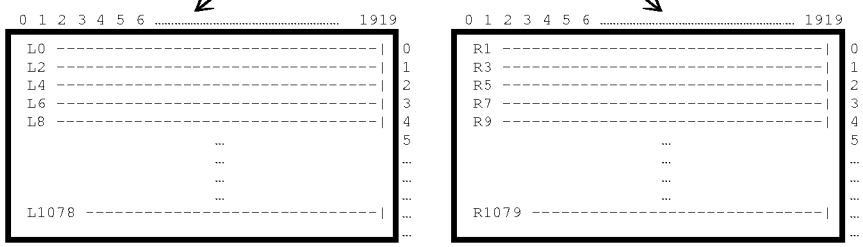

Simple Line De-interlace

Native Monitor Display
*1920 by 1080 resolution
Left Eye polarization - Even lines
Right Eye polarization – Odd lines*

  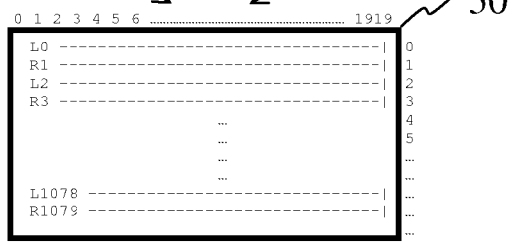

Flow chart notation used in Figs. 16-19

 Denotes progressive frame

E/O  Slash notation used to identify contents of a progressive frame

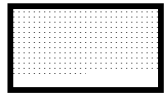 Denotes Interlaced Field

E  Contents of a single interlaced field

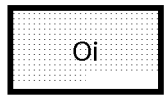 "i" denotes interpolated data. In this instance, a full frame interlaced field consisting of interpolated odd lines

 Denotes Side-by-Side 3D frame compatible format either progressive or interlaced

 Gray box denotes which eye the content corresponds to for 3D display

Fig. 20

METHODS AND SYSTEMS FOR PROCESSING STEREOSCOPIC VIDEO DATA

TECHNICAL FIELD

The present invention relates to methods and systems for processing stereoscopic video data. The present invention relates specifically to methods and systems for processing stereoscopic video data between the recording or the generation of left-eye and right-eye images and the display of the stereoscopic content on a stereoscopic three-dimensional (3D) display device.

BACKGROUND OF INVENTION

In the context of display technologies, stereoscopic 3D television (3DTV) monitors and display devices exist and are continuing to be developed for viewing stereoscopic video data: whether the stereoscopic video data has been produced directly from a scene, using for instance two cameras, or by conversion of pre-existing two-dimensional video content. Two stereoscopic 3D monitor technologies are available; namely, passive monitor technology and active monitor technology. Both create an illusion of depth using a two-dimensional (2D) screen and special wearable glasses.

The passive monitor technology displays left-eye and right-eye images simultaneously on alternating lines of a monitor, and polarizes these alternating lines differently. Therefore the left-eye and right-eye images are polarized differently. Passive glasses, worn by the users, allow images polarized in a first manner to be viewed by the user's left eye and images polarized in a second manner to be viewed by the user's right eye. Thus, only the left-eye images reach the user's left eye and only the right-eye images reach the user's right eye. In other words, the passive glasses filter the light so that the left-eye images are not viewed by the user's right eye and, conversely, the right-eye images are not viewed by the user's left eye.

The active monitor technology alternates left-eye and right-eye images sequentially in time. The active glasses, worn by the users, alternately allow images to be viewed by the user's left eye and images to be viewed by the user's right eye, using a shuttering mechanism synchronized with the monitor. Thus, when a left-eye image is displayed at a first instant on the active monitor, only the user's left eye can see it and when a right-eye image is displayed at a second instant on the active monitor, only the user's right eye can see it. The shuttering mechanism synchronized with the monitor may be based on the use of liquid-crystal-shutter (LCS) 3D glasses. The synchronization between the active glasses and the monitor may be based on an infrared link. The active monitor technology is therefore said to be "active" compared to the passive monitor technology not because the monitor itself would be more "active" but because the active monitor technology is based on the use of active glasses including a shuttering mechanism.

It is desirable to provide methods and systems to improve the quality of the stereoscopic video content viewed on stereoscopic 3D televisions and other display devices, and it is desirable to do so while efficiently using the storage and network resources necessary to store and transfer stereoscopic video data.

SUMMARY OF INVENTION

To meet or at least partially meet the above-mentioned goals, such methods and systems are defined in the independent claims. Advantageous embodiments are defined in the dependent claims.

In one embodiment, a method is provided for processing stereoscopic video data for transmission. The method includes being inputted with a left-eye image and a right-eye image, wherein each of the left-eye image and the right-eye image includes pixels, and each of the pixels is associated with color data (i.e., color data is assigned to each of the pixels). The method further includes multiplexing the left-eye image and the right-eye image into a single frame or field. The multiplexing is carried out by associating, with each of a set of positions selected from the left-eye image and each of a set of positions selected from the right-eye image, color data, wherein the color data associated with a selected position is derived either from the color data of the pixel identified by the selected position or from the color data of a group of pixels (wherein a group of pixels may notably be a macro-block) centered on the selected position; and by arranging the color data associated with the selected positions from the left-eye image and the color data associated with the selected positions from the right-eye image into the single frame or field. Furthermore, the set of positions selected from the left-eye image at least partially differs from the set of positions selected from the right-eye image.

Therefore, after left-eye and right-eye images have been captured, i.e. recorded from a scene or otherwise generated, the above-described method processes these images in a particular way to multiplex each left-eye and right-eye image into a single frame or field for transmission. The transmission may notably include, but is not limited to, the transmission of the frames or fields as a stream over a terrestrial link, a satellite link, or the storage of the frames or fields on a storage medium such as for instance an optical disc or a magnetized medium.

The single frame may be a progressive scan frame but is not limited thereto. In a progressive scan (also called non-interlaced scanning), all the lines of each frame are displayed simultaneously. The single field may also be an interlaced scan field but is not limited thereto. In interlaced video, a first field contains odd lines and the next field contains even lines. For example, first, during a first period of $\frac{1}{50}^{th}$ second, the odd lines of the first field are displayed and then, after all the odd lines have been displayed, the even lines of the next field are displayed during the next period of $\frac{1}{50}^{th}$ second. Afterwards, during a third period of $\frac{1}{50}^{th}$ second, the odd lines of the next field (half-frame) are displayed to replace the odd lines "painted" during the first period, etc. While this example mentions periods of $\frac{1}{50}^{th}$ second, i.e. the use of 50 frames per second, the use of other periods is possible, such as for instance periods of $\frac{1}{60}^{th}$ second. There are currently two primary standards, one based on 50 frames per second (used in Europe) and another based on 60 frames per second (used in the U.S.).

The purpose of multiplexing the left-eye and right-eye images into a single frame or field, a technique which is known in the art, is to be able to transfer, distribute and store the stereoscopic video data representing the 3D content using transfer and storage equipments originally designed for transferring and storing conventional 2D video data. The transfer and storage equipments may notably include video encoders and compression algorithms originally designed for coding 2D video data, satellite transmission equipment configured and typically used for transmitting 2D video data, video decoders originally designed for decoding 2D video data, and other equipment originally designed for 2D video data. Transferring both the complete left-eye and right-eye images separately from the source to the monitors would require major changes to the existing transmission (distribution) infrastructure and is not the approach adopted in this embodiment of the invention. Rather, this embodiment of the invention addresses multiplexing two images into a single frame or field through the compression of the two images—or through a similar mechanism—typically known as frame compatible.

In the method, the frame compatible signal is populated with some color data obtained or generated from the left-eye image and some color data obtained or generated from the right-eye image. However, rather than populating color data from the same set of positions in the left and right eye images, the method selects positions in the left eye source that at least partially differ from the right eye source. This asymmetry or spatial incongruity is an intentional pre-distortion which has been recognized by the inventor as being advantageous from an end-to-end perspective. Namely, at the receiving side, for passive monitors, i.e. when the frames or fields are used for rendering 3D video content on passive monitors, different image positions on the passive monitor are associated with the left-eye images and the right-eye images—specifically due to the construction of the monitors, even lines are statically polarized for the left eye and odd for the right eye, or vice-versa. The pre-distortion at the transmitting side takes into account this particular characteristic of the rendering on passive monitors in such a way as to reduce the amount of discarded data on the end-to-end chain. The method therefore leads to a more efficient end-to-end transmission and increases the quality of the images rendered on passive monitors. Indeed, the amount of interpolation required at the receiving side is reduced compared to a situation where the processing to populate the single frame or field at the transmitting side would be symmetric as to the positions of reference selected from the left-eye and right-eye images to derive the color data for the single frame or field. This reduction of processing required by the monitor also represents an advantage to monitor manufacturing companies, since the monitors themselves need not have as much processing power.

In other words, the purpose of performing multiplexing in this manner is to intentionally select and optimize which data is transmitted from the left-eye and right-eye images, and encapsulating the data in a single frame or field accordingly. If stereoscopic 3D content is compressed in a single 2D video stream (so that the existing 2D transport infrastructure can be reused), some video data must be discarded due to compression data loss during that process. The method takes a broader perspective of the entire end-to-end system and establishes a format which selectively discards visual content that may not be useful or may be less useful by the receiving 3D display technology. In the method, data is transmitted in such manner that less interpolation must be performed on the receiving side. Specifically, in embodiments of this method, no line interpolation—regenerating a complete line from adjacent pixel lines—is required. This leads to higher quality video signals, as produced by the passive monitor technology, since there is a reduced need to create or display interpolated data on the monitors.

By "the color data associated with a selected position is derived from the color data of the pixel identified by the selected position," it is meant that the color data of the pixel in the original image identified by the selected position is used to derive the color data to be arranged into the single frame or field for that selected position.

By "the color data associated with a selected position is derived from the color data of a group of pixels centered on the selected position," it is meant that the color data for that selected position is derived from more than one pixel of the original image and that, assuming that each pixel of the group of pixels contributes to the derivation according to a particular weight, the selected position is the center of gravity if the weights of the pixels of the group were corresponding to actual weights. A selected position is therefore not required to be in the center of one pixel. A selected position may be located somewhere else than in the center of one pixel. More generally, the selected positions act as reference positions in the original images for the purpose of populating the single frame or field, and, in the method of this embodiment, the set of selected positions in the left-eye and the set of selected positions in the right-eye images at least partially differ. As mentioned above, a group of pixels from which color data is derived may notably be a macro-block.

The selection of positions from the original images is not required as such to be a step of the method. The two sets of selected positions may be a predetermined parameter of the method. The two sets of positions may be determined in advance.

The use of the method is also advantageous for rendering stereoscopic video content on active monitors since the same inputted frames or fields can be transmitted, distributed and stored for efficient use by both passive and active monitors. There may be no direct advantage for active monitors compared to the prior art regarding the interpolation efficiency, but globally, an advantage exists, since the format proposed by the method may be efficiently used by both passive and active monitors.

The color data may be any type of data representing a color, such as RGB, YUV or other color definition, for instance coded in bits per pixel.

In one embodiment, each of the pixels of the left-eye and right-eye images is identified by a pair of coordinates, a pair of coordinates being here referred to as pixel address, and each selected position is a pixel address.

In this embodiment, each selected position from the original images used for populating the single frame or field is therefore a pixel address, such as for instance (0,0), (0,1) or (5,8). The set of pixel addresses selected from the left-eye image and the set of pixel addresses selected from the right-eye image respectively used to derive the color data for the left-eye and right-eye content of the single frame or field at least partially differ. In other words, the color data of a sub-set of pixels selected among the pixels of the original left-eye image and the color data of a sub-set of pixels selected among the pixels of the original right-eye image are used to populate the single frame or field, and these sub-sets at least partially differ.

In one embodiment, the set of positions selected from the left-eye image at least partially differs from the set of positions selected from the right-eye image in that more than x percent of the positions of the set of positions selected from the left-eye image differ from positions of the set of positions selected from the right-eye image, wherein at least one of the following applies: (i) x=10; (ii) x=25; (iii) x=50; (iv) x=75; (v) x=90; and (vii) x=95.

In one embodiment, none of the positions selected from the left-eye image is the same as a position selected from the right-eye image. In this embodiment therefore, the set of selected positions from the left-eye image and the set of selected positions from the right-eye image (the selected positions being used as reference positions for populating the single frame or field, as mentioned above) completely differ.

In a sub-embodiment of the preceding embodiment, the set of positions selected from the left-eye image and the set of positions selected from the right-eye image include positions selected from within pixels from a first set of pixels rows from the left-eye image and positions selected from within pixels from a second set of pixels rows from the right-eye image, wherein none of the rows of the first set is that same as a row of the second set.

In a sub-embodiment of the preceding sub-embodiment, the set of positions selected from the left-eye image and the set of positions selected from the right-eye image include one of: (i) a set of positions selected from within pixels from the even scan lines of the left-eye image and a set of positions selected from within pixels from the odd scan lines of the right-eye image; and (ii) a set of positions selected from within pixels from the odd scan lines of the left-eye image and a set of positions selected from within pixels from the even scan lines of the right-eye image.

These two alternatives (i) and (ii) apply to both the arrangement of color data into an interlaced scan field and into a progressive scan frame. This sub-embodiment is particularly advantageous for passive monitors since passive monitors are usually configured so that the light of every other scan line is polarized in such manner that the line will be viewed by either the left-eye or right-eye of a user wearing passive glasses. This enables to reduce the amount of interpolation required on the receiving side since the reference positions used for generating the transmitted video data may be set to correspond to the reference positions used on the receiving side.

In a sub-embodiment of the preceding sub-embodiment, the set of positions selected from the left-eye image and the set of positions selected from the right-eye image include one of: (i) a set of positions selected from half of the pixels from the even scan lines of the left-eye image and a set of positions selected from half of the pixels from the odd scan lines of the right-eye image; and (ii) a set of positions selected from half of the pixels from the odd scan lines of the left-eye image and a set of positions selected from half of the pixels from the even scan lines of the right-eye image.

This sub-embodiment applies especially to the multiplexing into an interlaced scan field. The number of pixels associated with the left eye in the interlaced scan field is therefore a quarter of the total number of pixels of the original left-eye image and, likewise, the number of pixels associated with the right-eye in the interlaced scan field is a quarter of the number of pixels of the original right-eye image.

Alternatively, the set of positions selected from the left-eye image and the set of positions selected from the right-eye image may include one of: (i) a set of positions selected from all the pixels from the even scan lines of the left-eye image and a set of positions selected from all the pixels of the odd scan lines from the right-eye image; and (ii) a set of positions selected from all the pixels from the odd scan lines of the left-eye image and a set of positions selected from all the pixels from the even scan lines of the right-eye image.

This sub-embodiment applies especially to the multiplexing into a progressive scan frame. The number of pixels associated with the left eye in the progressive scan frame is therefore half the total number of pixels of the original left-eye image and, likewise, the number of pixels associated with the right-eye in the progressive scan frame is half the number of pixels of the original right-eye image.

In one embodiment, the left-eye image and the right-eye image are multiplexed into a single field, and the single field is an interlaced scan field. In another embodiment, the left-eye image and the right-eye image are multiplexed into a single frame, and the single frame is a progressive scan frame.

In one embodiment, arranging the color data associated with the selected positions from the left-eye image and the color data associated with the selected positions from the right-eye image into the single frame or field is carried out in any one of (a) a side-by-side manner, (b) a top-bottom manner (also called "top-and-bottom" manner), (c) a line-by-line manner, and (d) a checkerboard manner.

Arranging pixels having color data derived from the color data associated with pixels from the left-eye image and pixels having color data derived from the color data of pixels from the right-eye image may be performed in a side-by-side manner, namely the single frame or field is vertically divided into two parts, wherein the left part includes pixels derived from the left-eye image and the right part includes pixels associated with right-eye image, or vice versa. The arrangement (i.e. the multiplexing) may also be performed in a top-bottom manner, namely the single frame or field is horizontally divided into two parts, wherein the top part includes pixels associated with the left-eye image and the bottom part includes pixels associated with the right-eye image, or vice versa.

The arrangement may also be performed in a line-by-line manner, wherein every other line is associated with either the left-eye image or the right-eye image. The arrangement of the pixels may also be performed in a checkerboard manner.

The side-by-side and top-bottom multiplexing are advantageous in that the resulting single frames or fields lend themselves well to spatial compression techniques typically used for 2D video content. In other words, spatial compression techniques designed for 2D content may be equally used to process the data of the single frame or field wherein the 3D content is multiplexed. The side-by-side and top-bottom multiplexing may therefore be viewed as more 2D frame compatible than the line-by-line and the checkerboard multiplexing.

The invention is not limited to the four above-mentioned arrangements ((a) side-by-side, (b) top-bottom, (c) line-by-line, (d) checkerboard). Other arrangements are possible, some being more 2D frame compatible than others. For instance, the single frame or field may be divided into four parts by a cross having its center on the center of frame or field. Each of the four parts therefore includes a contiguous set of pixels originating from the same original image, thus adapted for being subjected to typical 2D compression techniques.

The invention also relates to methods for processing stereoscopic video data on the receiving side. The processing is either for displaying the stereoscopic video data on a passive or active monitor to render 3D content.

First, embodiments of a method for processing and displaying stereoscopic video data on a passive monitor are described.

In one embodiment, a method is provided for processing stereoscopic video data formatted into a succession of frames or fields and for displaying the processed stereoscopic video data on a video display device suitable for use with passive glasses, the video display device being here referred to as passive monitor. The method includes being inputted with a frame or field, wherein the frame or field includes pixels and each of the pixels is associated with color data (i.e., color data is assigned to each of the pixels). The method further includes displaying simultaneously, on the passive monitor, pixels to be viewed by the left eye and pixels to be viewed by the right eye of a user bearing passive glasses suitable for use with the passive monitor, wherein each of the displayed pixels is associated with color data (i.e., color data is assigned to each of the pixels). In the method, the color data associated with the displayed pixels to be viewed by the left eye are derived from one part of the inputted frame or field, that one part being referred here to as input left eye part; and the color data associated with the displayed pixels to be viewed by the right eye are derived from another part of the inputted frame or field, that part being referred here to as input right eye part.

Furthermore, referring, in sequence from the leftmost, uppermost pixel to the rightmost, lowermost pixel, to the displayed pixels to be viewed by the left eye as pixels $DL_i$, wherein i is an integer with $1 \le i \le p$, further referring, in sequence from the leftmost, uppermost pixel to the rightmost, lowermost pixel, to the displayed pixels to be viewed by the right eye as pixels $DR_i$, wherein i is an integer with $1 \le i \le p$, further referring, in sequence from the leftmost, uppermost pixel to the rightmost, lowermost pixel, to the pixels of the input left eye part as pixels $InL_j$, wherein j is an integer with $1 \le j \le q$, and further referring, in sequence from the leftmost, uppermost pixel to the rightmost, lowermost pixel, to the pixels of the input right eye part as pixels $InR_j$, wherein j is an integer with $1 \le j \le q$; for at least some values of i, the color data associated with displayed pixel $DL_i$ is derived from the color data of one or more of pixels $InL_j$ in the same manner as the color data associated with displayed pixel $DR_i$ is derived from the color data of one or more of pixels $InR_j$.

The method is advantageous in that it is adapted to handle frames and fields produced by the above-mentioned method of processing stereoscopic video data for transmission. Therefore, the amount of interpolation is reduced on the receiving side and the quality of the displayed 3D content is improved. The words "in the same manner" are to be understood here as meaning which indices j or sets of indices j are used in the derivation process for which indices i.

When it is defined that the color data associated with the displayed pixels to be viewed by the left-eye are derived from the input left-eye part and the color data associated with the displayed pixels to be viewed by the right-eye are derived from the input right-eye part, how the parts are arranged with respect to each other may be notably in one of several manners, such as in a side-by-side manner, in a top-bottom manner, in a line-by-line manner, or in a checkerboard manner. These types of arrangements have been described above.

In one embodiment, the color data associated with displayed pixel $DL_i$ is derived from the color data of one or more of pixels $InL_j$ in the same manner as the color data associated with displayed pixel $DR_i$ is derived from the color data of one or more of pixels $InR_j$ for more than y percent of the values of i, wherein at least one of the following applies: (a) y=10; (b) y=25; (c) y=50; (d) y=75; (e) y=90; (f) y=95; and (g) y=100.

In one embodiment, displaying simultaneously, on the passive monitor, pixels to be viewed by the left eye and pixels to be viewed by the right eye of a user bearing passive glasses suitable for use with the passive monitor includes one of: (i) displaying pixels to be viewed by the left eye on even scan lines and pixels to be viewed by the right eye on odd scan lines; and (ii) displaying pixels to be viewed by the left eye on odd scan lines and pixels to be viewed by the right eye on even scan lines.

This embodiment corresponds to a particular type of passive monitor. The invention, however, is not limited to this type of passive monitor. For instance, a passive monitor may also be configured to display pixels to be viewed by the left eye on odd columns and pixels to be viewed by the right eye on even columns, or vice versa. An embodiment of the method of the invention may therefore be adapted to such type of passive monitor or others.

In one embodiment, the step of being inputted with a frame or field is a step of being inputted with a field, and the inputted field is an interlaced scan field. In another embodiment, the step of being inputted with a frame or field is a step of being inputted with a frame, and the inputted frame is a progressive scan frame.

Secondly, embodiments of a method for processing and displaying stereoscopic video data on active monitor are described.

Namely, in one embodiment, a method is provided for processing stereoscopic video data formatted into a succession of frames or fields and for displaying the processed stereoscopic video data on a video display device suitable for use with active glasses, the video display device being here referred to as active monitor. The method includes being inputted with a frame or field, wherein the frame or field includes pixels and each of the pixels is associated with color data (i.e., color data is assigned to each of the pixels). The method further includes displaying, on the active monitor, in a first frame, pixels to be viewed by the left eye of a user bearing active glasses suitable for use with the active monitor; and, in a second frame, either following or preceding the first frame, pixels to be viewed by the right eye of the user, wherein each of the displayed pixels is associated with color data (i.e., color data is assigned to each of the pixels). The method is further such that the color data associated with the displayed pixels to be viewed by the left eye are derived from one part of the inputted frame or field, that part being referred to here as input left eye part; and the color data associated with the displayed pixels to be viewed by the right eye are derived from another part of the inputted frame or field, that part being referred to here as input right eye part. Furthermore, referring, in the first frame, in sequence from the leftmost, uppermost pixel to the rightmost, lowermost pixel, to the displayed pixels to be viewed by the left eye as pixels $DL_i$, wherein i is an integer with $1 \le i \le 2p$; further referring, in the second frame, in sequence from the leftmost, uppermost pixel to the rightmost, lowermost pixel, to the displayed pixels to be viewed by the right eye as pixels $DR_i$, wherein i is an integer with $1 \le i \le 2p$; further referring, in sequence from the leftmost, uppermost pixel to the rightmost, lowermost pixel, to the pixels of the input left eye part as pixels $InL_j$, wherein j is an integer with $1 \le j \le q$; and further referring, in sequence from the leftmost, uppermost pixel to the rightmost, lowermost pixel, to the pixels of the input right eye part as pixels $InR_j$, wherein j is an integer with $1 \le j \le q$; for at least some values of i, the color data associated with displayed pixel $DL_i$ is derived from the color data of one or more pixels $InL_j$ in a different manner than the color data associated with displayed pixel $DR_i$ is derived from the color data of one or more pixels $InR_j$.

This method enables the efficient processing of frames or fields generated by the above-mentioned method for processing stereoscopic video data for transmission. The same type of frames or fields can therefore be used efficiently for both passive and active monitors. The words "in a different manner" are to be understood here as meaning which indices j or sets of indices j are used in the derivation process for which indices i.

In one embodiment, the color data associated with displayed pixel $DL_i$ is derived from the color data of one or more pixels $InL_j$ in a different manner than the color data associated with displayed pixel $DR_i$ is derived from the color data of one or more pixels $InR_j$ for more than z percent of the values of i, wherein at least one of the following applies: (a) z=10; (b) z=25; (c) z=50; (d) z=75; (e) z=90; (f) z=95; and (g) z=100.

In one embodiment, the step of being inputted with a frame or field is a step of being inputted with a field, and the inputted field is an interlaced scan field. In another embodiment, the step of being inputted with a frame or field is a step of being inputted with a frame, and the inputted frame is a progressive scan frame.

The invention also relates to systems and computer programs for carrying out the above-mentioned methods. The invention also relates to signals including frames or fields produced by any one of the methods, any one of the systems, or any one of the computer programs as mentioned above.

BRIEF DESCRIPTION OF DRAWINGS

Embodiments of the present invention shall now be described, in conjunction with the appended figures, in which:

FIG. 1 schematically illustrates the multiplexing of video data from a left-eye image and from a right-eye image into a single frame or field in a method in one embodiment of the invention;

FIG. 2 is a flowchart of a method in one embodiment of the invention, including the processing of stereoscopic video data for transmission;

FIG. 3 is a flowchart of a method in one embodiment of the invention, including the processing of a field or frame and the displaying of stereoscopic video content on a passive monitor;

FIG. 4 is a flowchart of a method in one embodiment of the invention, including the processing of a field or frame and the displaying of stereoscopic video content on an active monitor;

FIG. 5 schematically illustrates a system in one embodiment of the invention, notably configured for processing stereoscopic video data for transmission;

FIG. 6 schematically illustrates a system in one embodiment of the invention, notably configured for processing of a field or frame and for displaying of stereoscopic video content on a passive monitor;

FIG. 7 schematically illustrates a system in one embodiment of the invention, notably configured for processing of a field or frame and for displaying of stereoscopic video content on an active monitor;

FIG. 19 is a schematic flow chart of a processing and displaying method in one embodiment of the invention, wherein the stereoscopic video content is displayed on a passive monitor; and FIG. 20 explains the notations used in FIGS. 16-19.

DETAILED DESCRIPTION OF INVENTION

Figure 8A:
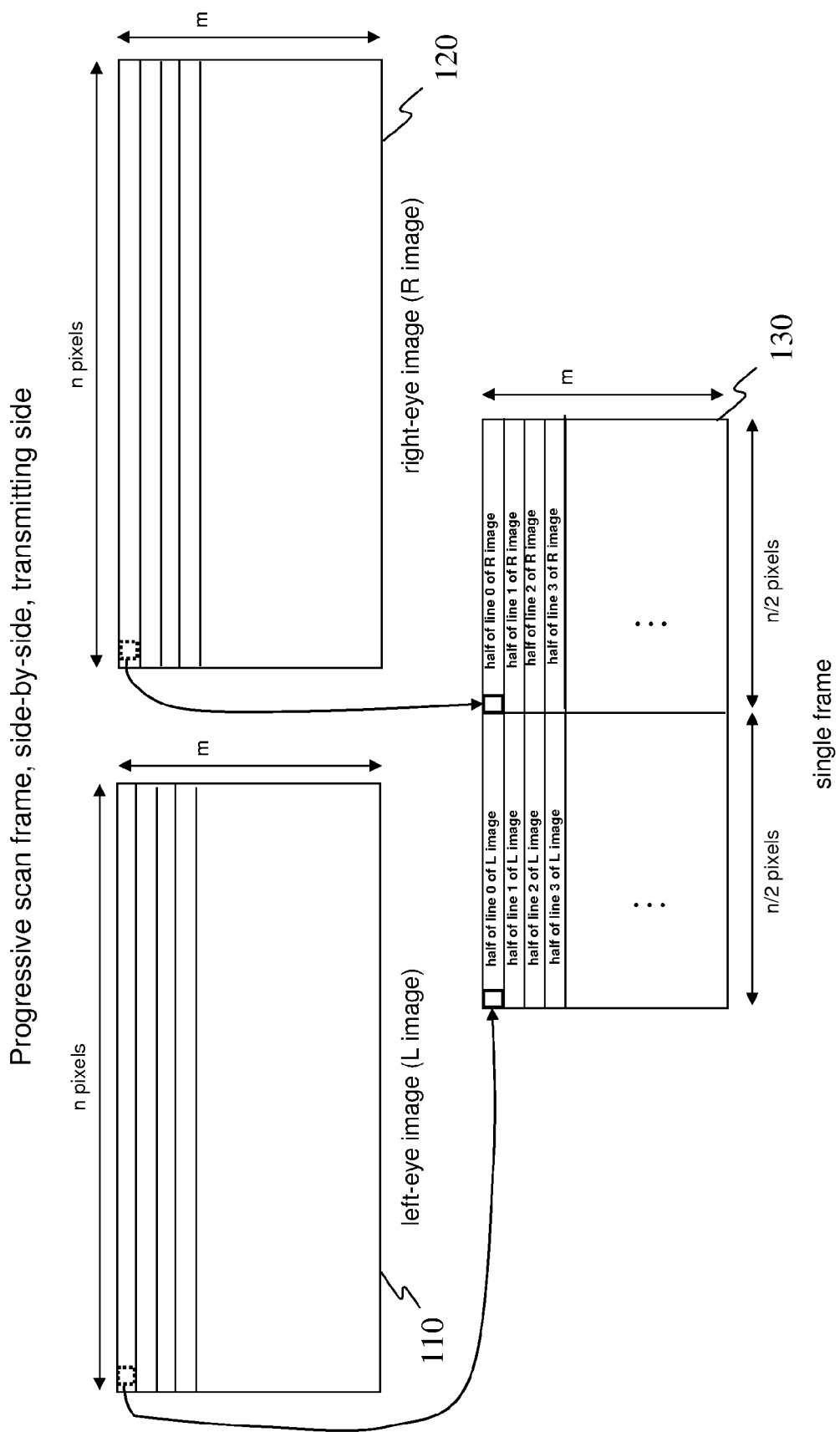
FIGS. 8a, 10a, 12a, and 14a schematically illustrate the multiplexing of video data from a left-eye image and from a right-eye image into a single frame or field in methods in four examples which are not part of the invention but which may be helpful to understand the advantages of the invention.

The present invention shall now be described in conjunction with specific embodiments. These specific embodiments serve to provide the skilled person with a better understanding, but are not intended to in any way restrict the scope of the invention, which is defined by the appended claims.

FIG. 1 schematically illustrates a multiplexing process in one embodiment of the invention, and, in particular, selected positions in a left-eye image 10 and a right-eye image 20 used as reference positions for populating the single frame or field 30, 40. The single frame 30 or field 40 is the result of multiplexing the stereoscopic video data from the left-eye image 10 and the right-eye image 20.

Namely, as schematically illustrated on FIG. 1, different selected positions are used in the left-eye image 10 and the right-eye image 20. The selected positions are depicted as black dots, while the white dots correspond to positions which are not selected. The black dots represent one pixel being selected or, alternatively, they may represent the center of a group of pixels used to derive the color data of the pixels of the single frame or field.

FIG. 2 is a flowchart of a method for processing stereoscopic video data for transmission, in one embodiment of the invention. The method includes a step s12 of being inputted with a left-eye image and a right-eye image. Each of the left-eye image and the right-eye image includes pixels, and each of the pixels is associated with color data. In other words, color data is assigned to each of the pixels. The method further includes a step s20 of multiplexing the left-eye image and the right-eye image into a single frame or field. The step s20 of multiplexing includes two sub-steps, a sub-step s22 of associating, i.e., deriving the color data, and a sub-step s24 of arranging, i.e. multiplexing the color date into the frame or field. The sub-step s22 includes associating color data with selected positions from the left-eye image and with selected positions from the right-eye image. The color data associated with a selected position is derived either from the color data of the pixels identified by the selected position or from the color data of a group of pixels centered on the selected position.

The sub-step s24 includes arranging the color data associated with the selected positions from the left-eye image and the color data associated with the selected positions from the right-eye image into the single frame or field. There are as many selected positions in the left-eye image as the number of pixels associated with the left-eye image in the single frame or field, and there are as many selected positions from the right-eye image as the number of pixels associated with the right-eye image into the single frame or field.

The sub-step s22 of associating color data with selected positions is carried out in such a manner that the set of positions selected from the left-eye image at least partially differs from the set of positions selected from the right-eye image.

The steps s12 and s20 are repeated for each pair of inputted left-eye and right eye images to create a stream of fields or frames (not illustrated on FIG. 2).

FIG. 3 is a flowchart of a method for processing stereoscopic video data formatted into a succession of frames or fields and for displaying the processed video data on a passive monitor, in one embodiment of the invention. The method includes a step s32 of being inputted with a single frame or field. The method further includes a step s36 of displaying, simultaneously, on the passive monitor, pixels to be viewed by the left eye and pixels to be viewed by the right eye of a user wearing passive glasses suitable for use with the passive monitor.

The method further includes, between steps s32 and s36, a step s34 of deriving color data for the pixels to be displayed in step s36. The way the displayed pixels to be viewed by the left eye are derived from the pixels associated to the left eye in the inputted frame or field is the same as the way the displayed pixels to be viewed by the right eye are derived from the pixels associated to the right eye in the inputted frame or field, when considering the available pixels of the left eye and of the right eye in the same order.

For instance, if the color data of the $9^{th}$ displayed pixel $DL_9$ to be viewed by the left eye may be derived from the color data of pixels $InL_4$ and $InL_5$ (wherein $InL_j$ is the $j^{th}$ pixel associated with the left-eye in the inputted frame or field), the color data associated with displayed pixel $DR_9$ to be viewed by the right eye is derived in the same manner from the color data of corresponding pixels $InR_4$ and $InR_5$ (wherein $InR_j$ is the $j^{th}$ pixel associated with the right-eye in the inputted frame or field). This is only an example of deriving in the same manner the color data of the displayed pixels associated with the left eye and the color data of the displayed pixels associated with the right eye.

The steps s32, s34 and s36 are repeated for each inputted frame or field (not illustrated on FIG. 3).

FIG. 4 is a flowchart of a method for processing stereoscopic video data formatted in a succession of frames or fields and for displaying the processed video data on an active monitor, in one embodiment of the invention. The method includes a step s42 of being inputted with a single frame or field and a step s46 of displaying the pixels on the active monitor. In particular, the step s46 of displaying pixels on the active monitor includes displaying in a first frame, pixels to be viewed by the left eye of the user wearing active glasses and, in a second frame, either following in time the first frame or preceding it in time, pixels to be viewed by the right eye.

The method includes, between steps s42 and s46, a step s44 of deriving the color data for the pixels to be displayed. How the color data associated with displayed pixels of the first frame (i.e., those pixels to be viewed by the left eye, at a first instant) is derived from the color data of pixels of the input left-eye part of the inputted frame or field is different from how the color data associated with the displayed pixels in the second frame (i.e., those pixels to be viewed by the right eye, at a second instant) is derived from the color data of the pixels from the input right-eye part of the inputted frame or field.

The steps s42, s44 and s46 are repeated for each inputted frame or field (not illustrated on FIG. 4).

FIG. 5 schematically illustrates a system 11 in one embodiment of the invention, for processing stereoscopic video data for transmission, corresponding to the method illustrated in FIG. 2. The system 11 includes an input unit 12 configured for being inputted with a left-eye image and a right-eye image. The system also includes a multiplexing unit 14 configured for multiplexing the left-eye image and the right-eye image into a single frame or field in the manner described with reference to FIG. 2. In particular, the multiplexing unit 14 is configured for associating color data with positions of the left-eye and right-eye image, wherein different sets of positions are used from the left-eye image and the right-eye image for the derivation of color data and for arranging the color data into the single frame or field.

System 11 may be made of separate devices collectively configured for performing the functions of input unit 12 and multiplexing unit 14. Multiplexing unit 14 may also be made of separate devices collectively configured for performing the functions of multiplexing unit 14, for instance for performing the derivation of color data to populate the single frame or field in successive separate stages.

FIG. 6 schematically illustrates a system 31 in one embodiment of the invention, for processing stereoscopic video data formatted in a succession of frames or fields and for displaying the corresponding 3D content on a passive monitor. The processing and displaying are carried out in a manner as described with reference to the method illustrated in FIG. 3. The system 31 includes an input unit 32 configured for being inputted with a frame or field; and a displaying unit 36 configured for displaying simultaneously, on the passive monitor, pixels to be viewed by the left eye and pixels to be viewed by the right eye of a user bearing passive glasses suitable for use with the passive monitor. The system 31 is further configured as described with reference to FIG. 3. In particular, the system 31 is configured for deriving color data for the pixels to be displayed on a passive monitor in the same manner from the pixels associated with the inputted left-eye image and the pixels associated with the inputted right-eye image.

FIG. 7 schematically illustrates a system 41 in one embodiment of the invention, for processing stereoscopic video data formatted in a succession of frames or fields and for displaying the process stereoscopic video data on an active monitor. The processing and displaying are carried out in the same manner as described with reference to the method illustrated in FIG. 4. The system 41 includes an input unit 42 configured for being inputted with a frame or field; and a displaying unit 46 configured for displaying, on the active monitor, in a first frame, pixels to be viewed by the left eye of a user bearing active glasses suitable for use with the active monitor; and, in a second frame, either following or preceding the first frame, pixels to be viewed by the right eye of the user. The system 41 is further configured as described with reference to FIG. 4. In particular, the system 41 is configured for deriving color data for the pixels to be displayed on an active monitor in a different manner from the pixels associated with the inputted left-eye image and from the pixels associated with the inputted right-eye image.

Systems 31 and 41 may each be made of separate devices, such as for instance a receiver, a set-top box and a monitor, collectively configured for performing the functions of input units 32 and 42 respectively and the derivation of color data. In such a manner, an embodiment of the invention may for instance be implemented by adding a set-top box to a conventional monitor.

FIGS. 8a-8c, 10a-10c, 12a-12c, and 14a-14c schematically illustrate examples of methods which do not constitute embodiments of the invention. These examples may however help understanding how methods according to embodiments of the invention are carried out and especially the methods according to embodiments of the invention as illustrated in FIGS. 9a-9c, 11a-11c, 13a-13c, and 15a-15c.

FIG. 8a schematically illustrates an example of how a left-eye image 110 (also abbreviated as "L image") and a right-eye image 120 (also abbreviated as "R image") may be multiplexed in a progressive scan frame 130. The left-eye image 110, as illustrated in the upper left portion of FIG. 8a, includes m lines (also called rows) of n pixels each. The right-eye image 120, as illustrated in the upper right portion of FIG. 8a, also includes m lines of n pixels each. The progressive scan frame 130, in which the left-eye image 110 and the right-eye image 120 are multiplexed, includes m lines of n pixels each.

The multiplexing in the progressive scan frame 130 is performed in a side-by-side manner. This means that the progressive scan frame 130 is vertically divided into two parts including each m lines of n/2 pixels each. A first part of the progressive scan frame 130, i.e., in FIG. 8a, the portion on the left side of the progressive scan frame 130, is populated with pixels having color data derived from the color data of pixels of the left-eye image 110, whereas a second part of the progressive scan frame 130, i.e., in FIG. 8a, the portion on the right side of the progressive scan frame 130, is populated with pixels having color data derived from the color data of pixels of the right-eye image 120.

In particular, the first line of the first part of the progressive scan frame 130 includes n/2 pixels representing "half of line 0 of L image," i.e., representing the color data of the n pixels of the first line of the left-eye image 110 using only n/2 pixels. That is, the n/2 pixels of the first line of the first part of the progressive scan frame 130 represent the first line of the left-eye image 110 in a compressed form. For instance, the color data of the pixel at the address (0, 0) in the progressive scan frame 130 is derived from the color data of the pixels at the addresses (0, 0) and (0, 1) in the left-eye image 110, as illustrated by the arrow from the small dotted square in the left-eye image 110 to the first small square on the upper left of the progressive scan frame 130.

Likewise, the first line of the second part of the progressive scan frame 130 includes n/2 pixels representing "half of line 0 of R image," i.e., representing the color data of the n pixels of the first line of the right-eye image 120 using only n/2 pixels. That is, the n/2 pixels of the first line of the second part of the progressive scan frame 130 represent the first line of the right-eye image 120 in a compressed form. For instance, the color data of the pixel at the address (0, n/2) in the progressive scan frame 130 is derived from the color data of the pixels at the addresses (0, 0) and (0, 1) in the right-eye image 120, as illustrated by the arrow from the small dotted square in the right-eye image 120 to the second small square depicted in the progressive scan frame 130.

In other words, in the example of FIG. 8a, the same positions in the left-eye image 110 and in the right-eye image 120 are used for deriving the color data of corresponding pixels in the multiplexed single frame 130. The words "corresponding pixels in the multiplexed single frame 130" are to be understood as follows. If each available pixel in the first part of the progressive scan frame 130 is assigned a sequence number j, wherein 1≤j≤q, wherein here q=m·n/2, if each available pixel in the second part of the progressive scan frame 130 is also assigned a sequence number j, wherein 1≤j≤q, wherein here also q=m·n/2, and if the assignment of sequence numbers is performed in the same manner in both parts of the progressive scan frame 130 (such as for instance from the uppermost, leftmost pixel to the lowermost, rightmost pixel and line by line), corresponding pixels in the multiplexed frame 130 are those having the same sequence number j.

Figure 9A:
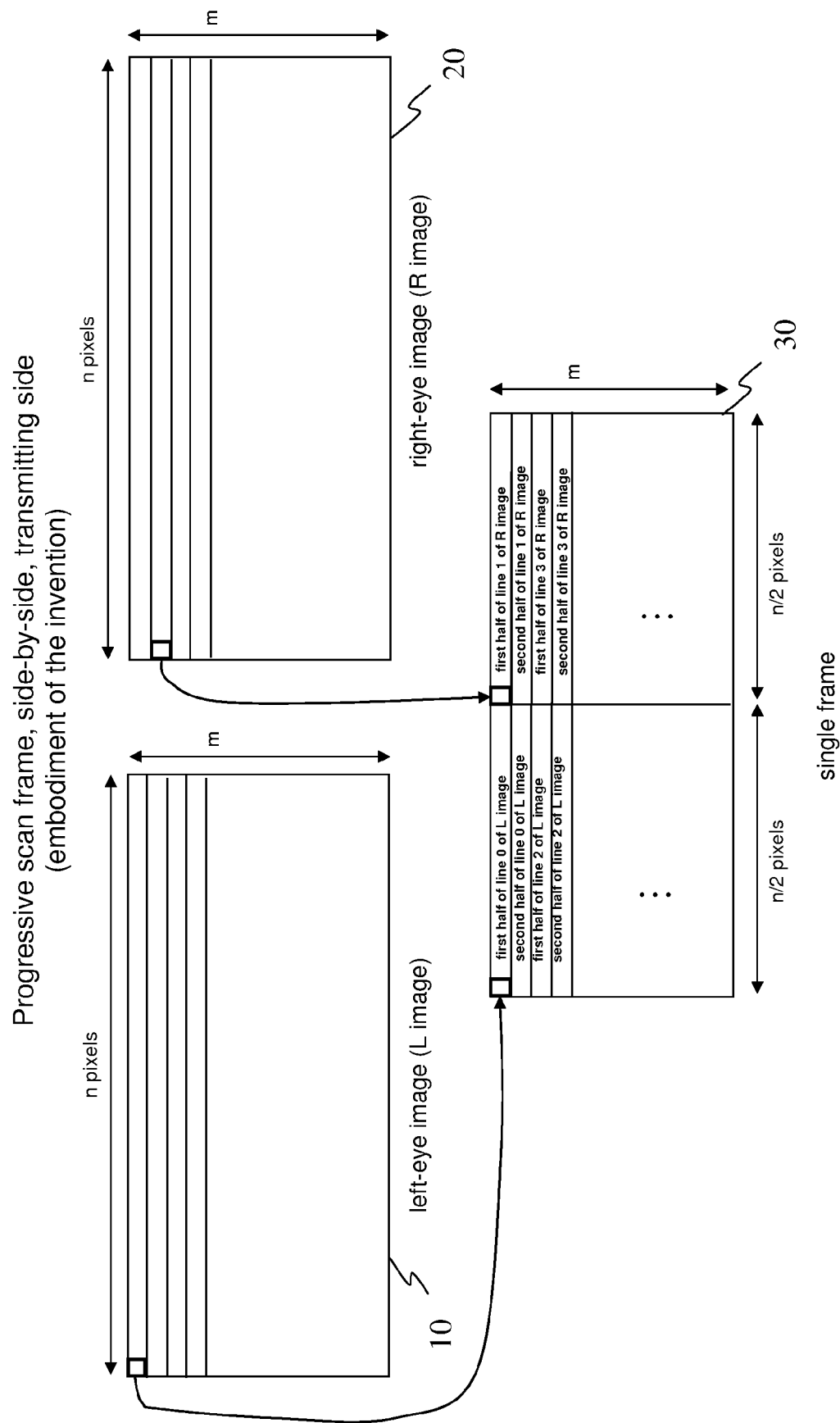
FIGS. 9a, 11a, 13a and 15a schematically illustrate the multiplexing of video data from a left-eye image and from a right-eye image into a single frame or field in methods in four embodiments of the invention.

In contrast, in the example of FIG. 9a, which is part of the invention, different positions in the left-eye image 10 and in the right-eye image 20 are used as references for deriving the color data of corresponding pixels in the multiplexed single frame 30, as illustrated and as it will now be further understood.

FIG. 9a schematically illustrates an example of how a left-eye image 10 (also abbreviated as "L image") and a right-eye image 20 (also abbreviated as "R image") may be multiplexed in a progressive scan frame 30, in one embodiment of the invention. The left-eye image 10, as illustrated in the upper left portion of FIG. 9a, includes m lines of n pixels each, and the right-eye image 20, as illustrated in the upper right portion of FIG. 9a, also includes m lines of n pixels each. The progressive scan frame 30, in which the left-eye image 10 and the right-eye image 20 are multiplexed, includes m lines of n pixels each.

The multiplexing in the progressive scan frame 30 is performed in a side-by-side manner. This means that the progressive scan frame 30 is vertically divided into two parts having including each m lines of n/2 pixels each. A first part of the progressive scan frame 30, i.e., in FIG. 9a, the portion on the left side of the progressive scan frame 30, is populated with pixels having color data derived from the color data of pixels of the left-eye image 10, whereas a second part of the progressive scan frame 30, i.e., in FIG. 9a, the portion on the right side of the progressive scan frame 30, is populated with pixels having color data derived from the color data of pixels of the right-eye image 20.

In particular, the first line of the first part of the progressive scan frame 30 includes n/2 pixels representing a "first half of line 0 of L image," i.e., representing the color data of the first n/2 pixels of the first line of the left-eye image 10, while the second line of the first part of the progressive scan frame 30 includes n/2 pixels representing a "second half of line 0 of L image," i.e., representing the color data of the last n/2 pixels of the first line of the left-eye image 10. For instance, the color data of the pixel at the address (0, 0) in the progressive scan frame 30 is derived from the color data of the pixel at the address (0, 0) in the left-eye image 10, as illustrated by the arrow from the small square in the left-eye image 10 to the first small square on the upper left of the progressive scan frame 30.

The first line of the second part of the progressive scan frame 30 includes n/2 pixels representing a "first half of line 1 of R image," i.e., representing the color data of the first n/2 pixels of the second line of the right-eye image 20, while the second line of the second part of the progressive scan frame 30 includes n/2 pixels representing a "second half of line 1 of R image," i.e., representing the color data of the last n/2 pixels of the second line of the right-eye image 20. For instance, the color data of the pixel at the address (0, n/2) in the progressive scan frame 30 is derived from the color data of the pixel at the address (1, 0) in the right-eye image 20, as illustrated by the arrow from the small square in the right-eye image 20 to the second small square depicted on the progressive scan frame 30.

Therefore, in the example of FIG. 9a, which is part of the invention, different sets of positions in the left-eye image 10 and in the right-eye image 20 are used for deriving the color data of corresponding pixels in the multiplexed single frame 30.

Figure 8B:
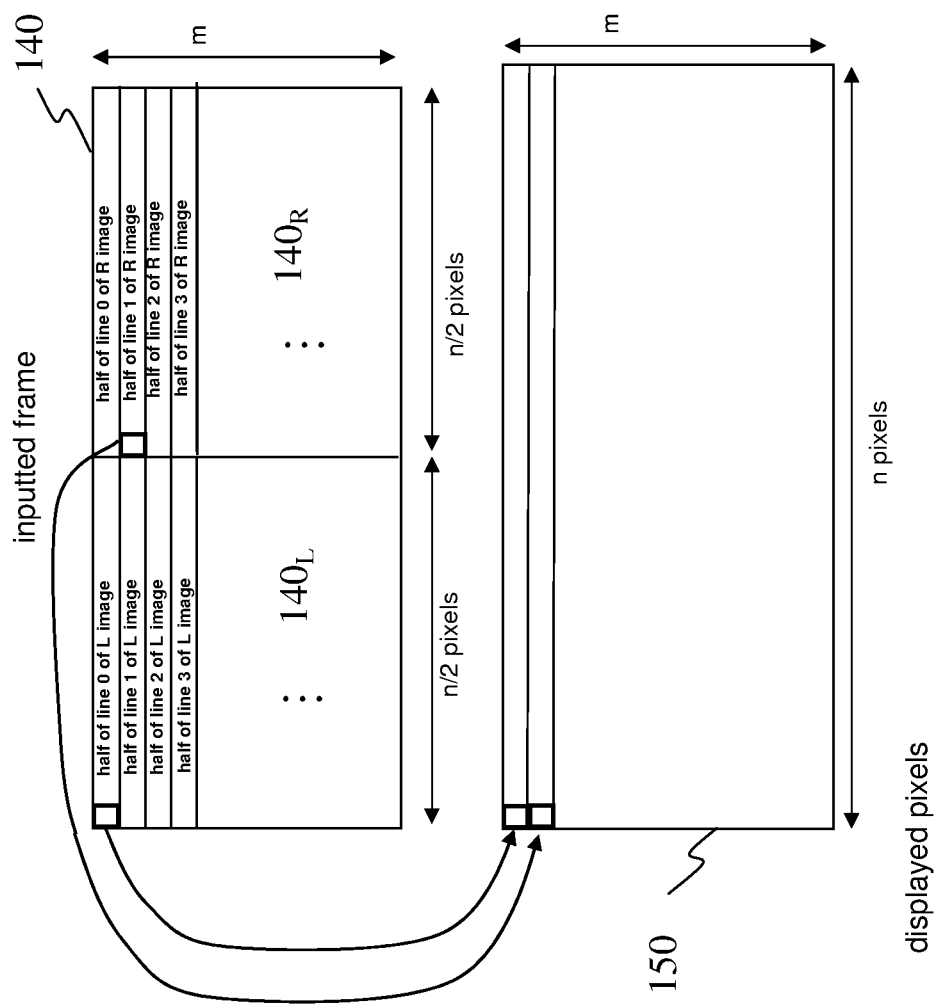
FIGS. 8b-8c, 10b-10c, 12b-12c, and 14b-14c schematically illustrate the processing of a frame or field and the displaying of stereoscopic video data accordingly, in methods in eight examples which are not part of the invention but which may be helpful to understand the advantages of the invention.
Figure 8C:
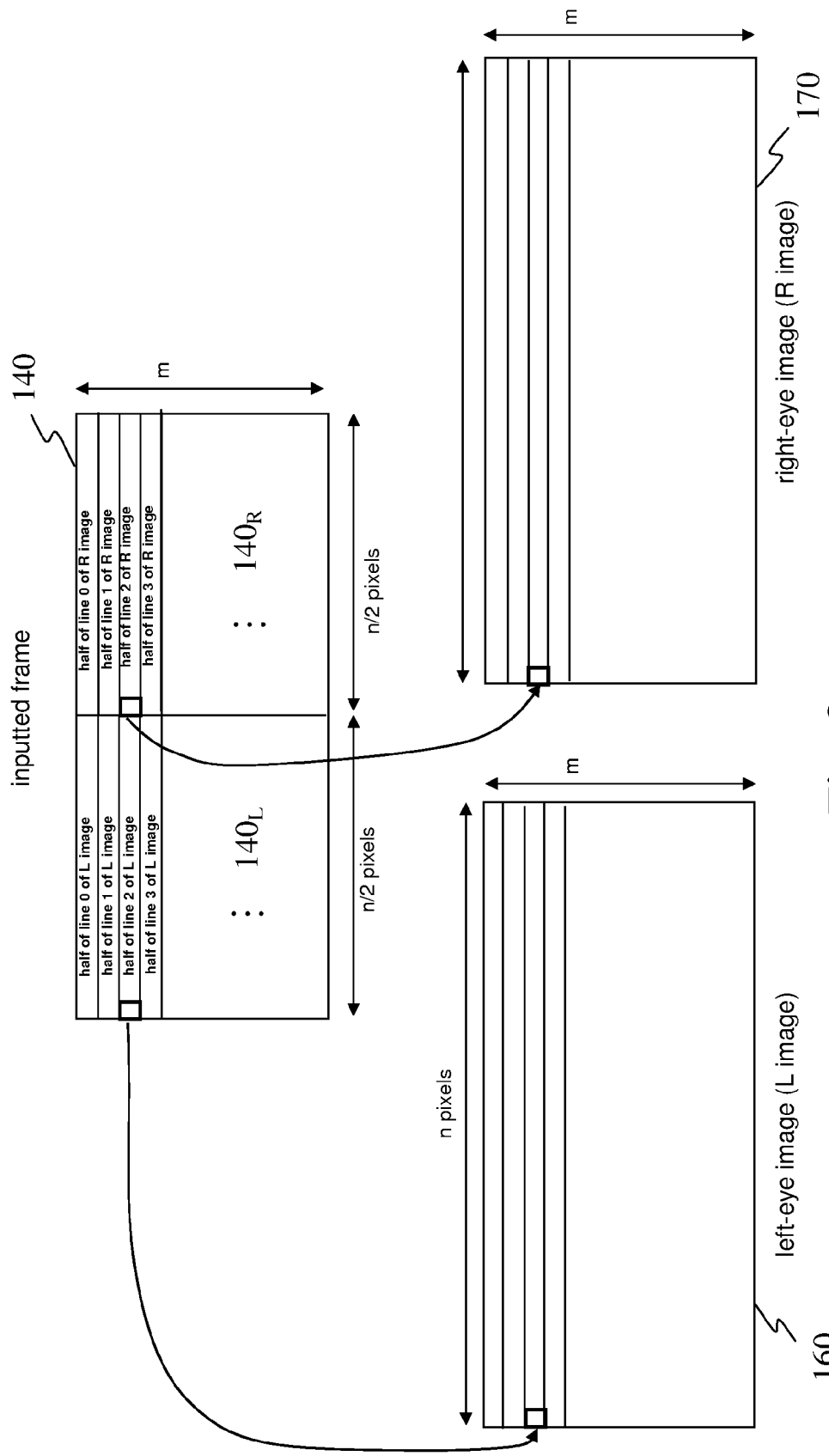

FIG. 8b schematically illustrates an example of how the color data of pixels 150 to be displayed simultaneously on a passive monitor may be derived from the color data of the pixels from two parts of an inputted frame 140, i.e., from the input left eye part $140_L$ and the input right eye part $140_R$. The inputted frame 140 is a progressive scan frame which includes m lines of n pixels each. Stereoscopic video data has been multiplexed in a side-by-side manner in the inputted frame 140. The input left eye part $140_L$, which includes m lines of n/2 pixels each, includes video data which has been derived from pixels of the original left-eye image (the original left-eye image is not illustrated on FIG. 8b). The input right eye part $140_R$, which also includes m lines of n/2 pixels each, includes video data which has been derived from pixels of the original right-eye image (the original right-eye image is not illustrated on FIG. 8b). The inputted frame 140 may correspond to the frame 130 illustrated on FIG. 8a. The passive monitor is configured for displaying the pixels 150, i.e. m lines of n pixels each, wherein the even lines are pixels to be viewed by the left eye and are polarized accordingly and the odd lines are pixels to be viewed by the right eye and are polarized accordingly.

In particular, the first line of the input left eye part $140_L$ of the progressive scan frame 140 includes n/2 pixels representing "half of line 0 of L image," i.e., representing the color data of the n pixels of the first line of the original left-eye image (not illustrated in FIG. 8b) using only n/2 pixels. The color data of the pixel at the address (0, 0) of the pixels 150 to be displayed by the passive monitor is derived, and especially interpolated, from the color data of the pixel at the address (0, 0) in the input left eye part $140_L$, as illustrated by the arrow from the small square in the input left eye part $140_L$ to the first small square on the upper left of the pixels 150.

The first line of the input right eye part $140_R$ of the progressive scan frame 140 includes n/2 pixels representing "half of line 0 of R image," i.e., representing the color data of the n pixels of the first line of the original right-eye image (not illustrated in FIG. 8b) using only n/2 pixels. The color data of the pixel at the address (1, 0) of the pixels 150 to be displayed by the passive monitor is derived, and especially interpolated, from the color data of the pixel at the address (1, n/2) in the input right eye part $140_R$, as illustrated by the arrow from the small square in the input right eye part $140_R$ to the second small square depicted on the pixels 150.

In other words, in the example of FIG. 8b, pixels from the input left eye part $140_L$ are used for deriving the color data of the pixels associated with the left-eye image among the pixels 150 to be displayed by the passive monitor in a different manner than pixels from the input right eye part $140_R$ are used for deriving the color data of the pixels associated with the right-eye image among the pixels 150 to be displayed by the passive monitor, when considering the same order of available pixels in the input left eye part $140_L$ and in the input right eye part $140_R$ and the same order of available pixels associated with the left-eye image and available pixels associated with the right-eye image among the pixels 150 to be displayed by the passive monitor.

In yet other words, if each available pixel in the input left eye part $140_L$ of the inputted progressive scan frame 140 is assigned a sequence number j and referred to as $InL_j$, wherein $1 \leq j \leq q$, wherein here $q=m \cdot n/2$, if each available pixel in the input right eye part $140_R$ of the inputted progressive scan frame 140 is also assigned a sequence number j and referred to as $InR_j$, wherein $1 \leq j \leq q$, wherein here also $q=m \cdot n/2$, if each pixel associated with the left-eye image to be displayed by the passive monitor is assigned a sequence number i and referred to as $DL_i$, wherein $1 \leq i \leq p$ and here $p=m \cdot n/2$, and if each pixel associated with the right-eye image to be displayed by the passive monitor is assigned a sequence number i and referred to as $DR_i$, wherein $1 \leq i \leq p$ and here also $p=m \cdot n/2$, then the color data associated with displayed pixel $DL_i$ is derived from the color data of one or more of pixels $InL_j$ in a different manner than the color data associated with displayed pixel $DR_i$ is derived from the color data of one or more of pixels $InR_j$. For instance, as shown in FIG. 8b, $DL_1$ is derived from $InL_1$ whereas $DR_1$ is derived from $InR_{n/2+1}$ (the first pixel of the second line of the input right eye part $140_R$) rather than from $InR_1$ (the first pixel of the first line of the input right eye part $140_R$).

Figure 9B:
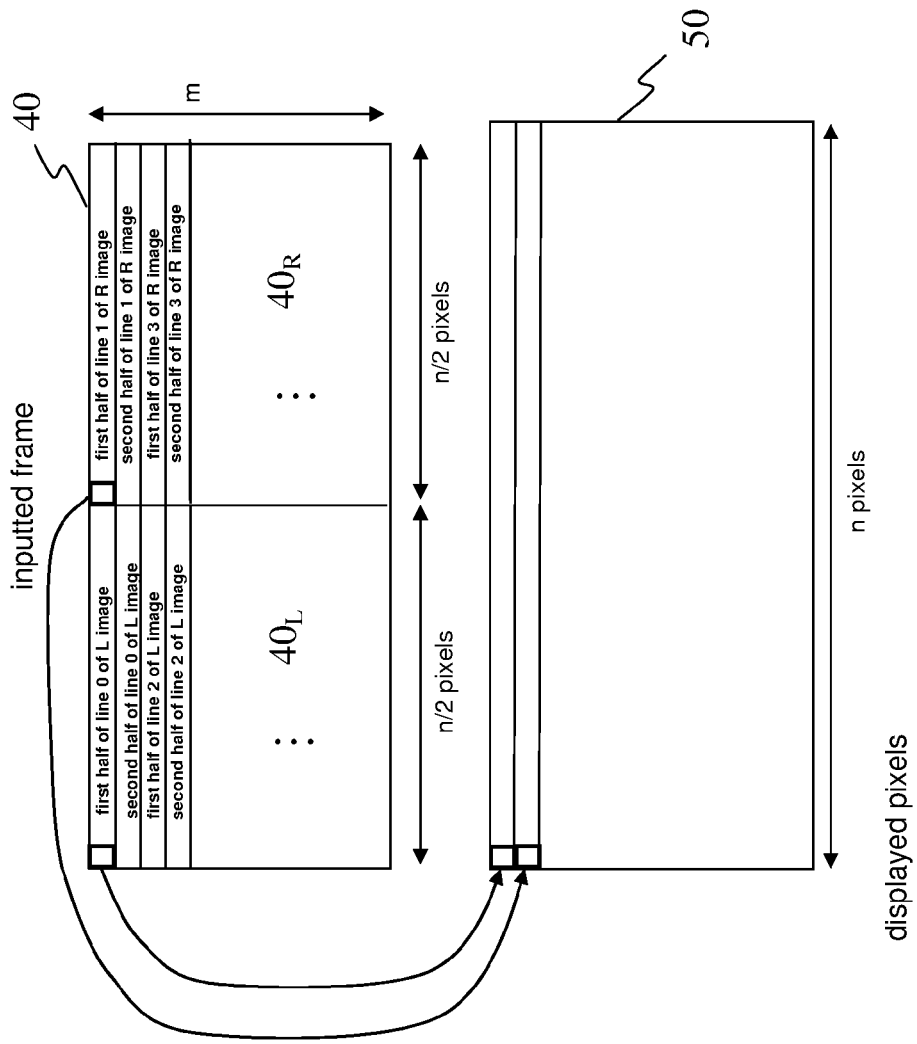
FIGS. 9b-9c, 11b-11c, 13b-13c, and 15b-15c schematically illustrate the processing of a frame or field and the displaying of stereoscopic video data accordingly, in methods in eight embodiments of the invention.
Figure 9C:
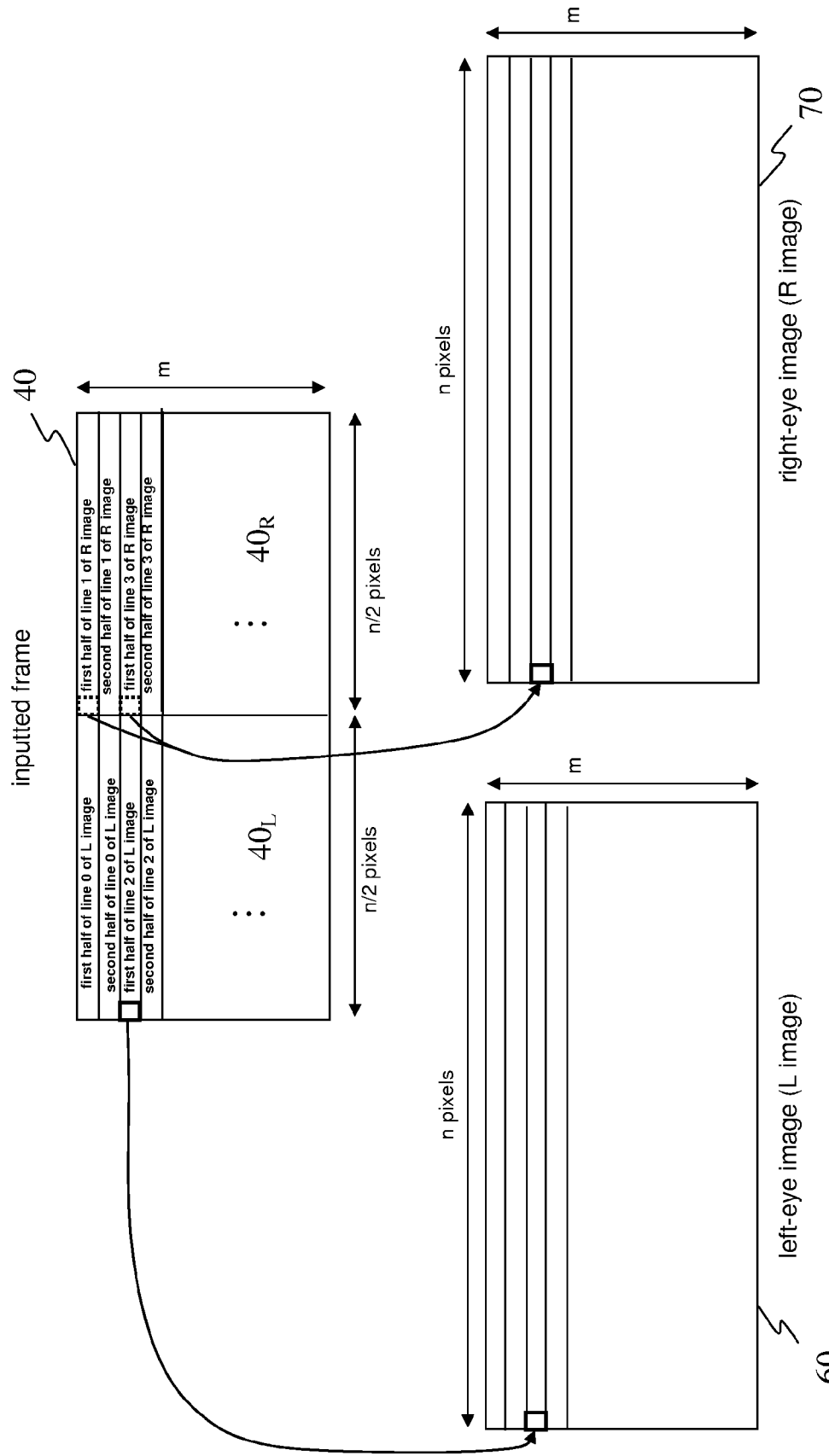
Figure 10A:
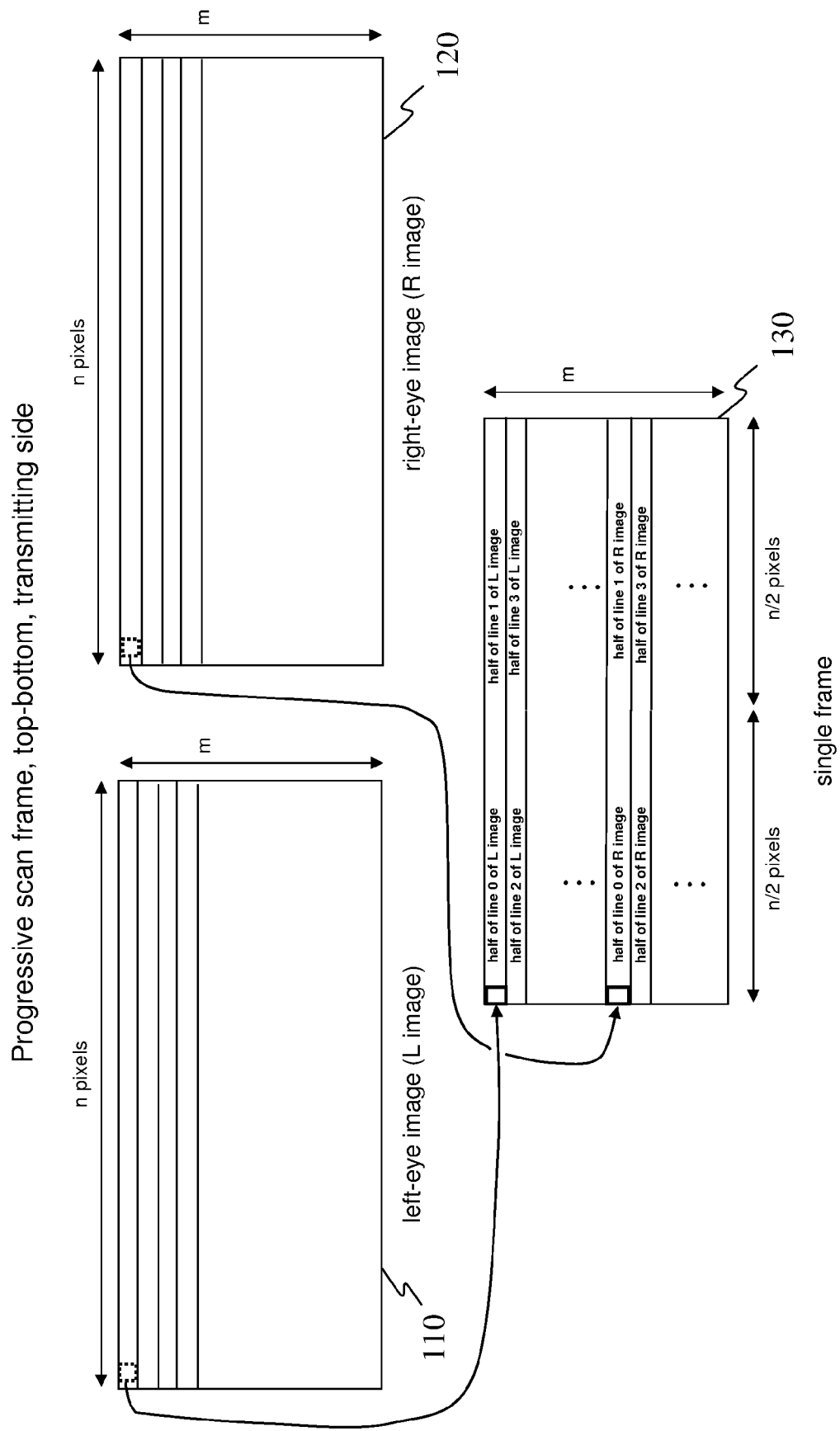
Figure 10B:
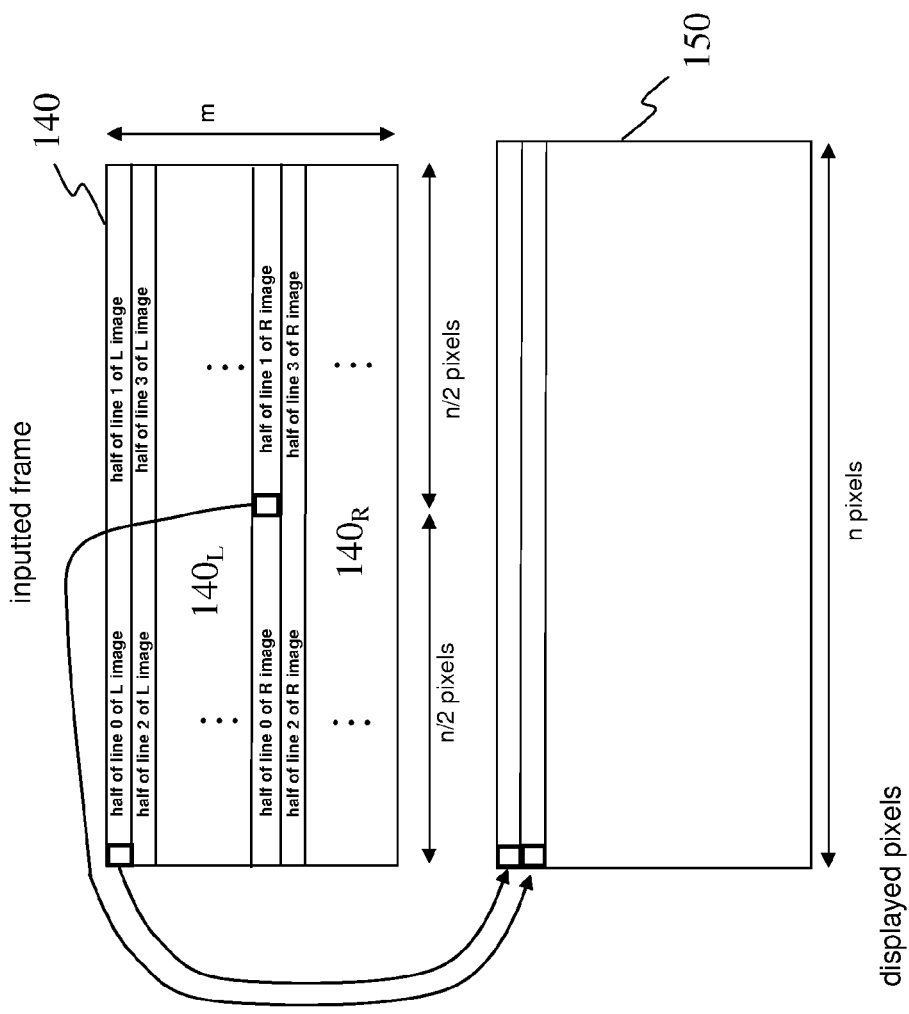
Figure 10C:
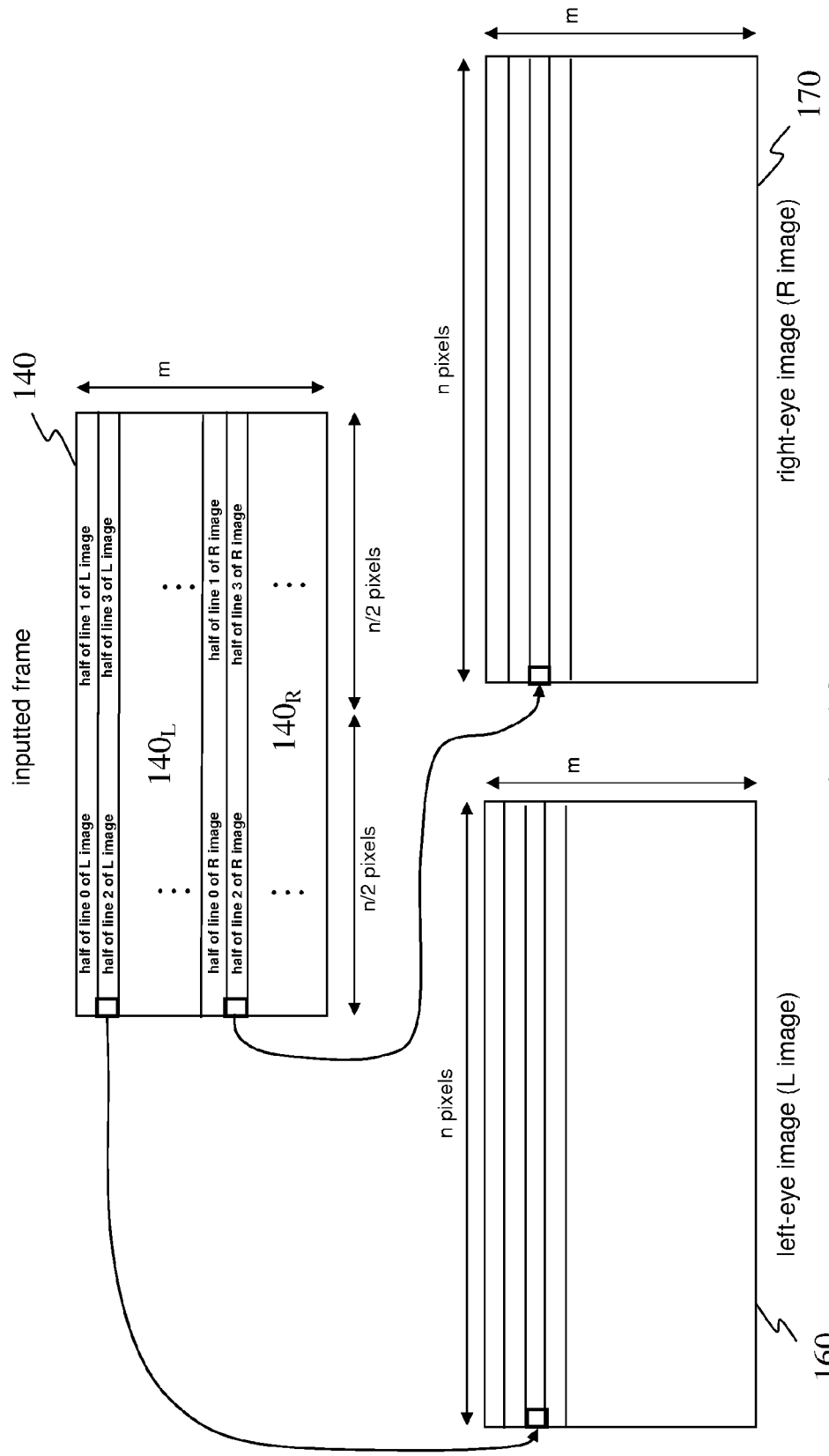

In contrast, in the example of FIG. 9b, which is part of the invention, the derivation of the left-eye video content and the derivation of the right-eye video content to be displayed on the passive monitor are carried out in the same manner from corresponding part of the input left eye part $40_L$ and the input right eye part $40_R$ of the inputted progressive scan frame 40. This will be understood in more details in view of the following.

FIG. 9b schematically illustrates an example of how, in one embodiment of the invention, the color data of pixels 50 to be displayed simultaneously on a passive monitor may be derived from the color data of the pixels from two parts of an inputted frame 40, i.e., from the input left eye part $40_L$ and the input right eye part $40_R$. The inputted frame 40 is a progressive scan frame and includes m lines of n pixels each. Stereoscopic video data has been multiplexed in a side-by-side manner in the inputted frame 40. The input left eye part $40_L$, which includes m lines of n/2 pixels each, includes video data which has been derived from pixels of the original left-eye image (not illustrated in FIG. 9b). The input right eye part $40_R$, which also includes m lines of n/2 pixels each, includes video data which has been derived from pixels of the original right-eye image (not illustrated in FIG. 9b). The inputted frame 40 may correspond to the frame 30 illustrated on FIG. 9a. The passive monitor is configured for displaying pixels 50, including m lines of n pixels each, wherein the even lines are pixels to be viewed by the left eye and are polarized accordingly and the odd lines are pixels to be viewed by the right eye and are polarized accordingly, or vice versa in another embodiment.

In particular, the first line of the input left eye part $40_L$ of the progressive scan frame 40 includes n/2 pixels representing a "first half of line 0 of L image," i.e., representing the color data of the first n/2 of the pixels of the first line of the original left-eye image (the original left-eye image is not illustrated in FIG. 9b). The color data of the pixel at the address (0, 0) of the pixels 50 to be displayed by the passive monitor is derived from the color data of the pixel at the address (0, 0) in the input left eye part $40_L$, as illustrated by the arrow from the small square in the input left eye part $40_L$ to the first small square on the upper left of the pixels 50.

The first line of the input right eye part $40_R$ of the progressive scan frame 40 includes n/2 pixels representing a "first half of line 1 of R image," i.e., representing the color data of the first n/2 pixels of the first line of the original right-eye image (the original right-eye image is not illustrated in FIG. 9b). The color data of the pixel at the address (1, 0) of the pixels 50 to be displayed by the passive monitor is derived from the color data of the pixel at the address (0, n/2) in the progressive scan frame 40, i.e. the first pixel in the input right eye part $40_R$, as illustrated by the arrow from the small square in the input right eye part $40_R$ to the second small square depicted on the pixels 50.

In other words, in the example of FIG. 9b, pixels from the input left eye part $40_L$ are used for deriving the color data of the pixels associated with the left-eye image among the pixels 50 to be displayed by the passive monitor in the same manner as pixels from the input right eye part $40_R$ are used for deriving the color data of the pixels associated with the right-eye image among the pixels 50 to be displayed by the passive monitor, when considering the same order of available pixels in the input left eye part $40_L$ and the input right eye part $40_R$ and the same order of available pixels associated with the left-eye image and available pixels associated with the right-eye image among the pixels 50 to be displayed by the passive monitor.

In yet other words, if each available pixel in the input left eye part $40_L$ of the inputted progressive scan frame 40 is assigned a sequence number j and referred to as $InL_j$, wherein $1 \leq j \leq q$, wherein here $q=m \cdot n/2$, if each available pixel in the input right eye part $40_R$ of the inputted progressive scan frame 40 is also assigned a sequence number j and referred to as InR$_j$, wherein 1≤j≤q, wherein here also q=m·n/2, if each pixel associated with the left-eye image to be displayed by the passive monitor is assigned a sequence number i and referred to as DL$_i$, wherein 1≤i≤p and here p=m·n/2, and if each pixel associated with the right-eye image to be displayed by the passive monitor is assigned a sequence number i and referred to as DR$_i$, wherein 1≤i≤p and here also p=m·n/2, then the color data associated with displayed pixel DL$_i$ is derived from the color data of one or more of pixels InL$_j$ in the same manner as the color data associated with displayed pixel DR$_i$ is derived from the color data of one or more of pixels InR$_j$. For instance, as shown in FIG. 9b, DL$_1$ is derived from InL$_1$, and DR$_1$ is derived from InR$_1$.

It follows that, in the example of FIG. 9b, less interpolation is required compared to the example of FIG. 8b, because, in FIG. 9b, the data existing in the inputted frame 40 is more fully used (i.e., with less interpolation) than, in FIG. 8b, the data existing in the inputted frame 140. This leads to higher quality video signal.

FIGS. 8a and 9a have therefore been compared and FIGS. 8b and 9b have also been compared to explain some features of embodiments of the invention. Comparing in the same manner FIGS. 8c and 9c, as well as comparing FIGS. 10a, 10b, 10c, 12a, 12b, 12c, 14a, 14b, 14c with FIGS. 11a, 11b, 11c, 13a, 13b, 13c, 15a, 15b, 15c respectively would also enable a skilled person to further understand features of other embodiments of the invention. Table 1 further helps to summarize the characteristics of these Figures.

a progressive scan frame ("progressive") or an interlaced scan field ("interlaced"). The fifth column indicates whether, on the transmitter side, the multiplexed frame or field or, on the receiving side, the inputted frame of field multiplexes the left-eye and right-eye content in a side-by-side manner ("side-by-side") or a top-bottom manner ("top-bottom"). The sixth column indicates whether the derivation of color data is performed in the same manner for the left-eye and right-eye content ("same manner") or in the different manner for the left-eye and right-eye content ("different manner"). The seventh column indicates whether the example is part of the invention ("yes") or not ("no"). Finally, the eighth column indicates whether the arrangement of the pixel content in the multiplexed frame or field is suitable ("acceptable") for efficient use with existing typical 2D encoding techniques, including notably compression techniques, or not ("sub-optimal").

In FIGS. 8c, 10c, 12c, 14c, the reference numerals 160 and 170 respectively refer to the left eye image and right-eye image to be displayed by the active monitor, in examples not being part of the invention. For these examples, it can be observed that the derivation of color data is carried out in the same manner from the input left eye part 140$_L$ and from the input right eye part 140$_R$.

In FIGS. 9c, 11c, 13c, 15c, the reference numerals 60 and 70 respectively refer to the left eye image and right-eye image to be displayed by the active monitor, in embodiments of the invention. For these examples, it can be observed that the

TABLE 1

Characteristics of FIGS. 8a-15c.

| Figs. | Tx/Rx side | passive/ active monitor | progressive/ interlaced | side-by-side/ top-bottom | derivation from LE and RE images | part of invention | encoding compatibility |
|---|---|---|---|---|---|---|---|
| 8a | Tx | — | progressive | side-by-side | same manner | no | acceptable |
| 8b | Rx | passive | progressive | side-by-side | different manner | no | acceptable |
| 8c | Rx | active | progressive | side-by-side | same manner | no | acceptable |
| 9a | Tx | — | progressive | side-by-side | different manner | yes | sub-optimal |
| 9b | Rx | passive | progressive | side-by-side | same manner | yes | sub-optimal |
| 9c | Rx | active | progressive | side-by-side | different manner | yes | sub-optimal |
| 10a | Tx | — | progressive | top-bottom | same manner | no | sub-optimal |
| 10b | Rx | passive | progressive | top-bottom | different manner | no | sub-optimal |
| 10c | Rx | active | progressive | top-bottom | same manner | no | sub-optimal |
| 11a | Tx | — | progressive | top-bottom | different manner | yes | acceptable |
| 11b | Rx | passive | progressive | top-bottom | same manner | yes | acceptable |
| 11c | Rx | active | progressive | top-bottom | different manner | yes | acceptable |
| 12a | Tx | — | interlaced | side-by-side | same manner | no | acceptable |
| 12b | Rx | passive | interlaced | side-by-side | different manner | no | acceptable |
| 12c | Rx | active | interlaced | side-by-side | same manner | no | acceptable |
| 13a | Tx | — | interlaced | side-by-side | different manner | yes | acceptable |
| 13b | Rx | passive | interlaced | side-by-side | same manner | yes | acceptable |
| 13c | Rx | active | interlaced | side-by-side | different manner | yes | acceptable |
| 14a | Tx | — | interlaced | top-bottom | same manner | no | sub-optimal |
| 14b | Rx | passive | interlaced | top-bottom | different manner | no | sub-optimal |
| 14c | Rx | active | interlaced | top-bottom | same manner | no | sub-optimal |
| 15a | Tx | — | interlaced | top-bottom | different manner | yes | sub-optimal |
| 15b | Rx | passive | interlaced | top-bottom | same manner | yes | sub-optimal |
| 15c | Rx | active | interlaced | top-bottom | different manner | yes | sub-optimal |

In Table 1, the first column lists the drawing concerned. The second column indicates whether the processing is performed on the transmitter side ("Tx", i.e. post-processing) or whether the processing is performed on the receiver side ("Rx"). The third column indicates whether the processing is performed for rendering 3D video content on a passive monitor ("passive"), on an active monitor ("active") or on both a passive and active monitors ("-"). The fourth column indicates whether, on the transmitter side, the multiplexed frame or field or, on the receiving side, the inputted frame of field is derivation of color data is carried out in a different manner from the input left eye part 40$_L$ and from the input right eye part 40$_R$. For instance, in the example illustrated in FIG. 9c, the pixel indicated by a small square in the right-eye image 70 is derived from two pixels (illustrated by the two small dotted squares) of the input right eye part 40$_R$, whereas the pixel indicated by a small square in the left-eye image 60 is derived from one pixel of the input left eye part 40$_L$.

Figure 12A:
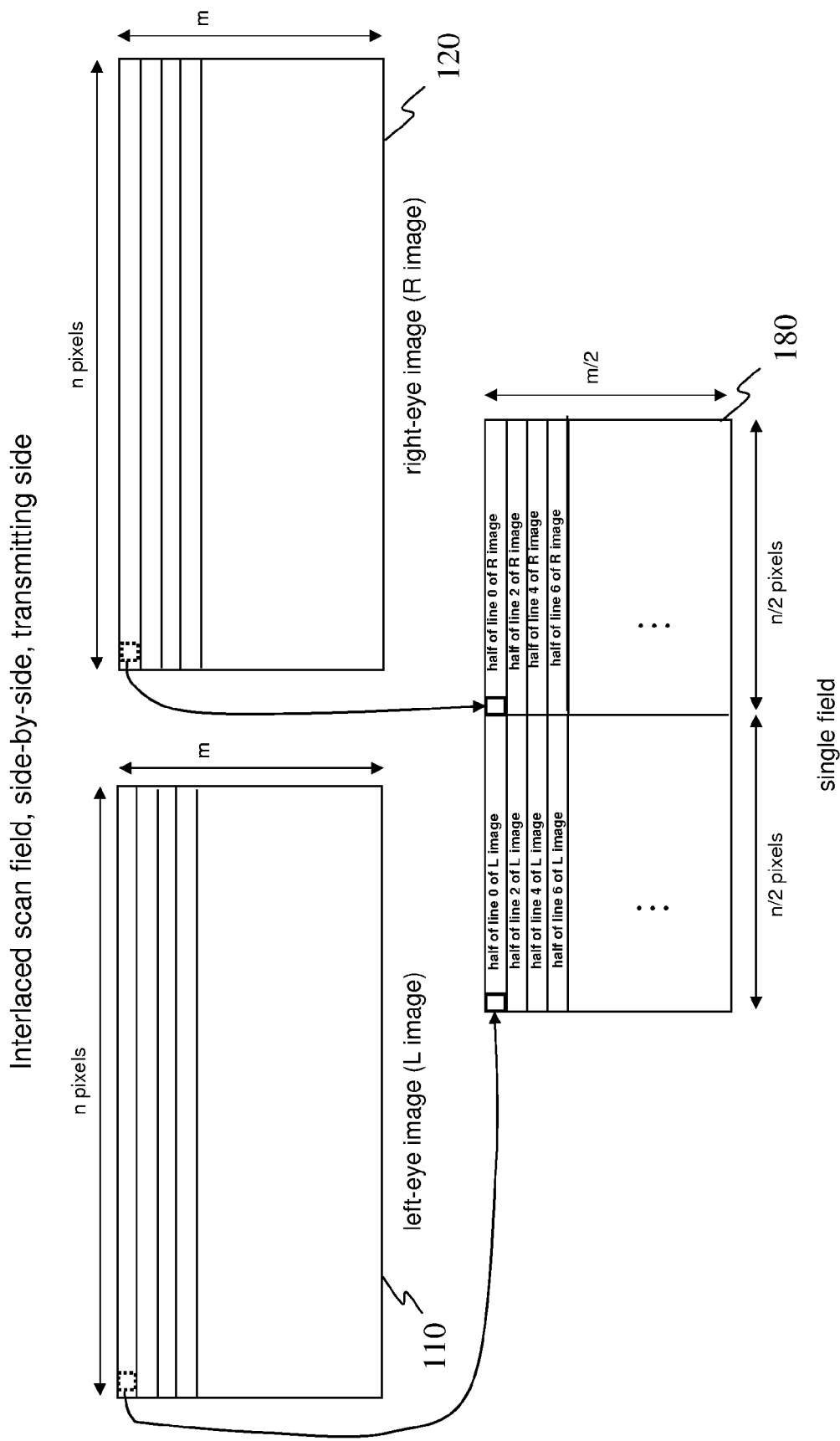
Figure 14A:
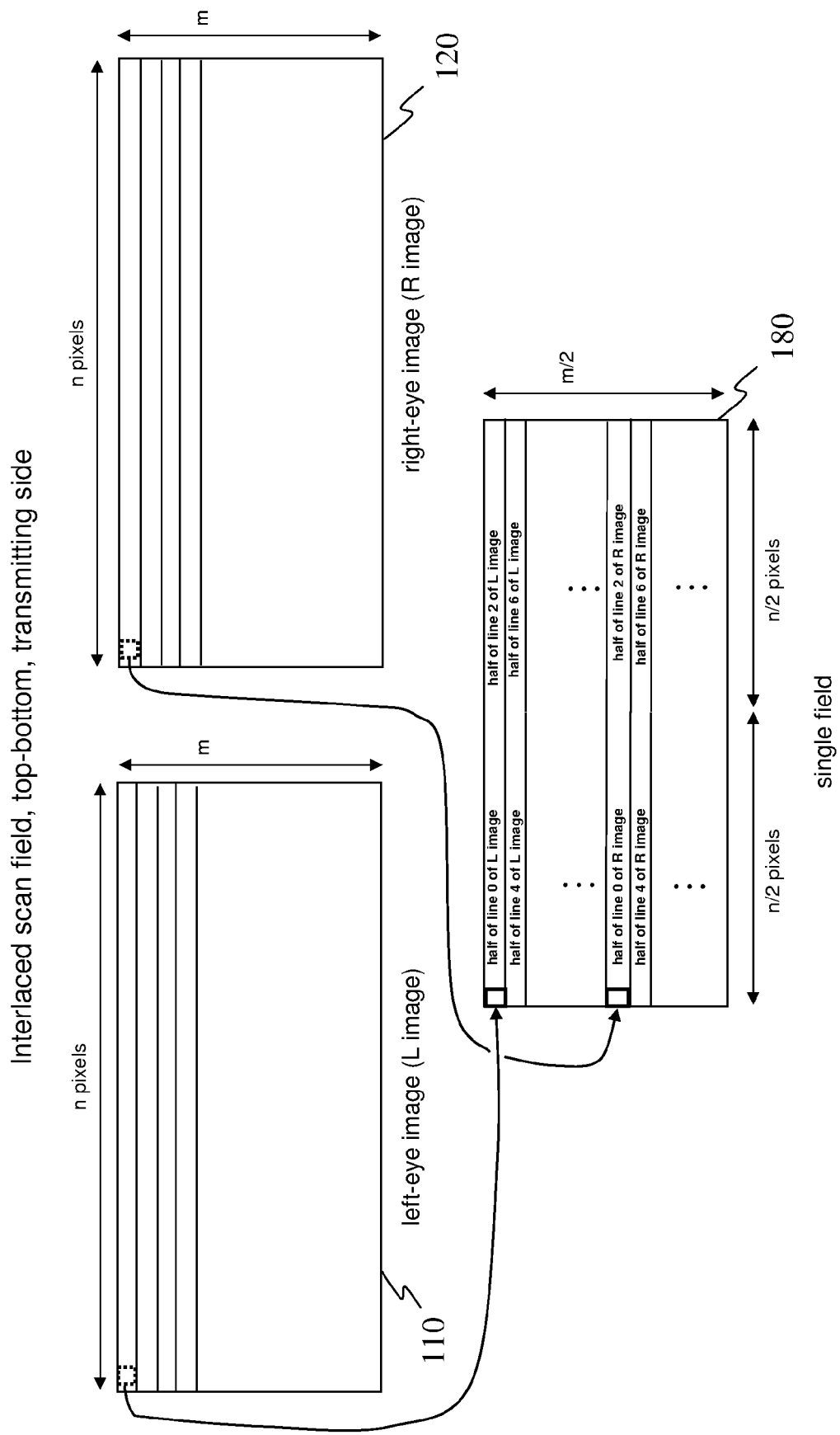
Figure 14B:
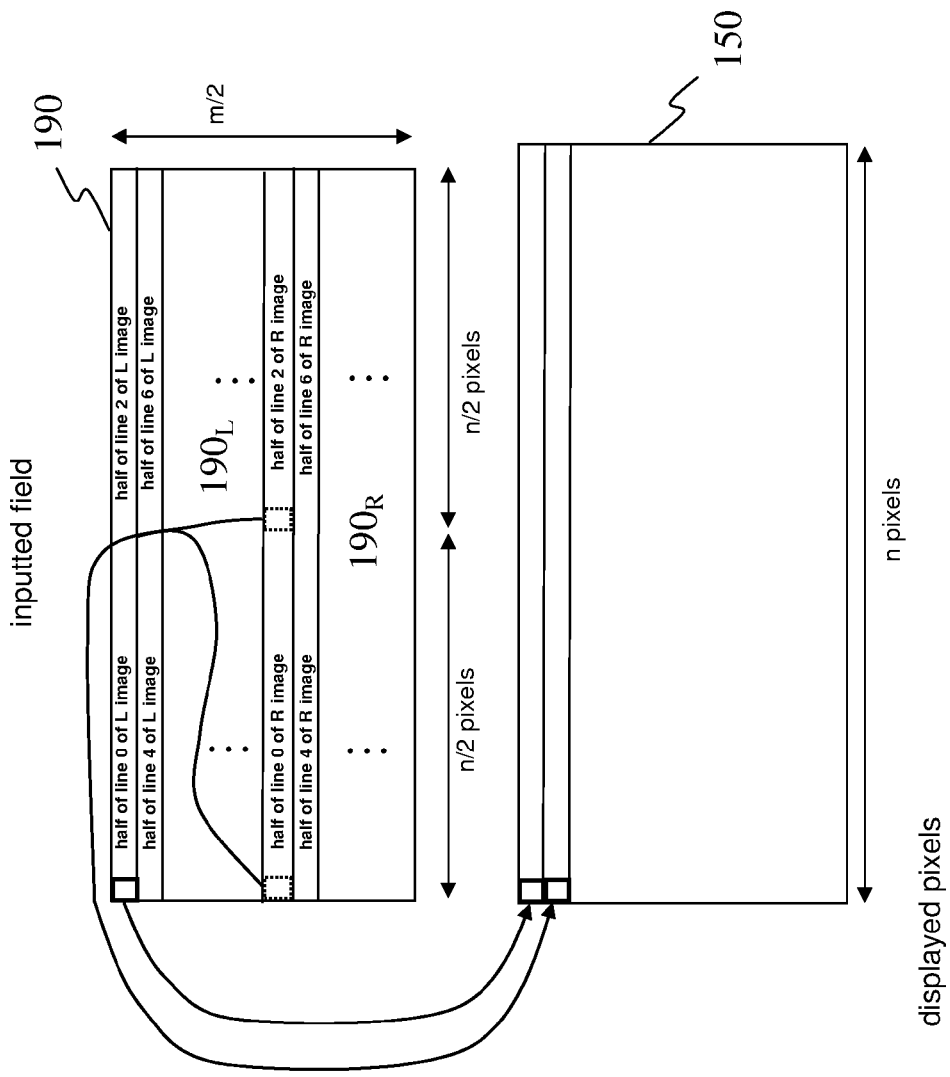
Figure 14C:
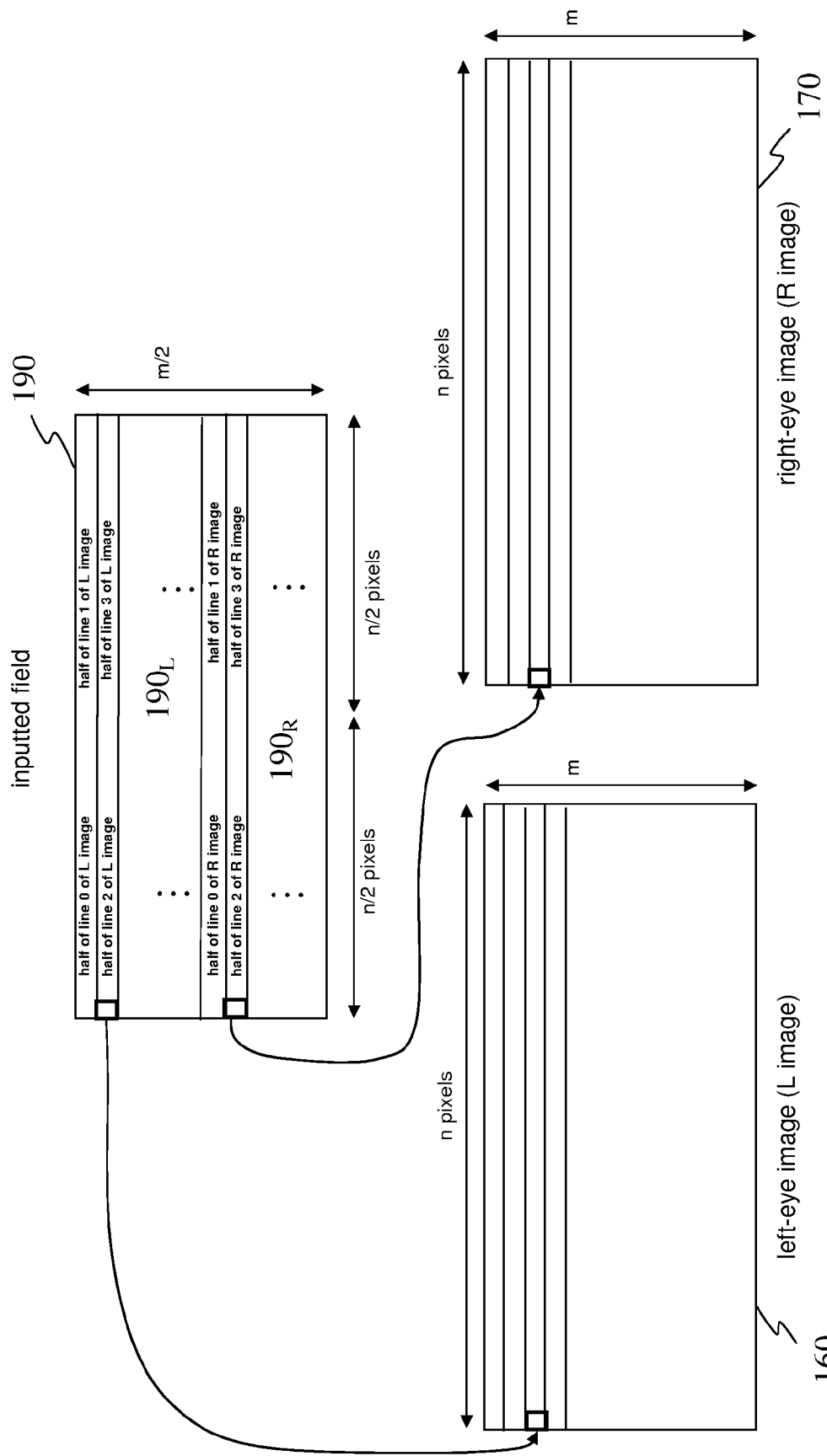

In FIGS. 12a and 14a, reference numeral 180 refers to an interlaced scan field. This field includes m/2 lines of n/2 pixels each. Likewise, in FIGS. 12b, 12c, 14b, 14c, reference numeral 190 refers to an interlaced scan field, which also includes m/2 lines of n/2 pixels each. Still in FIGS. 12b, 12c, 14b, 14c, reference numerals $190_L$ and $190_R$ refer respectively to the input left eye part and the input right eye part of the interlaced scan field 190.

Figure 13A:
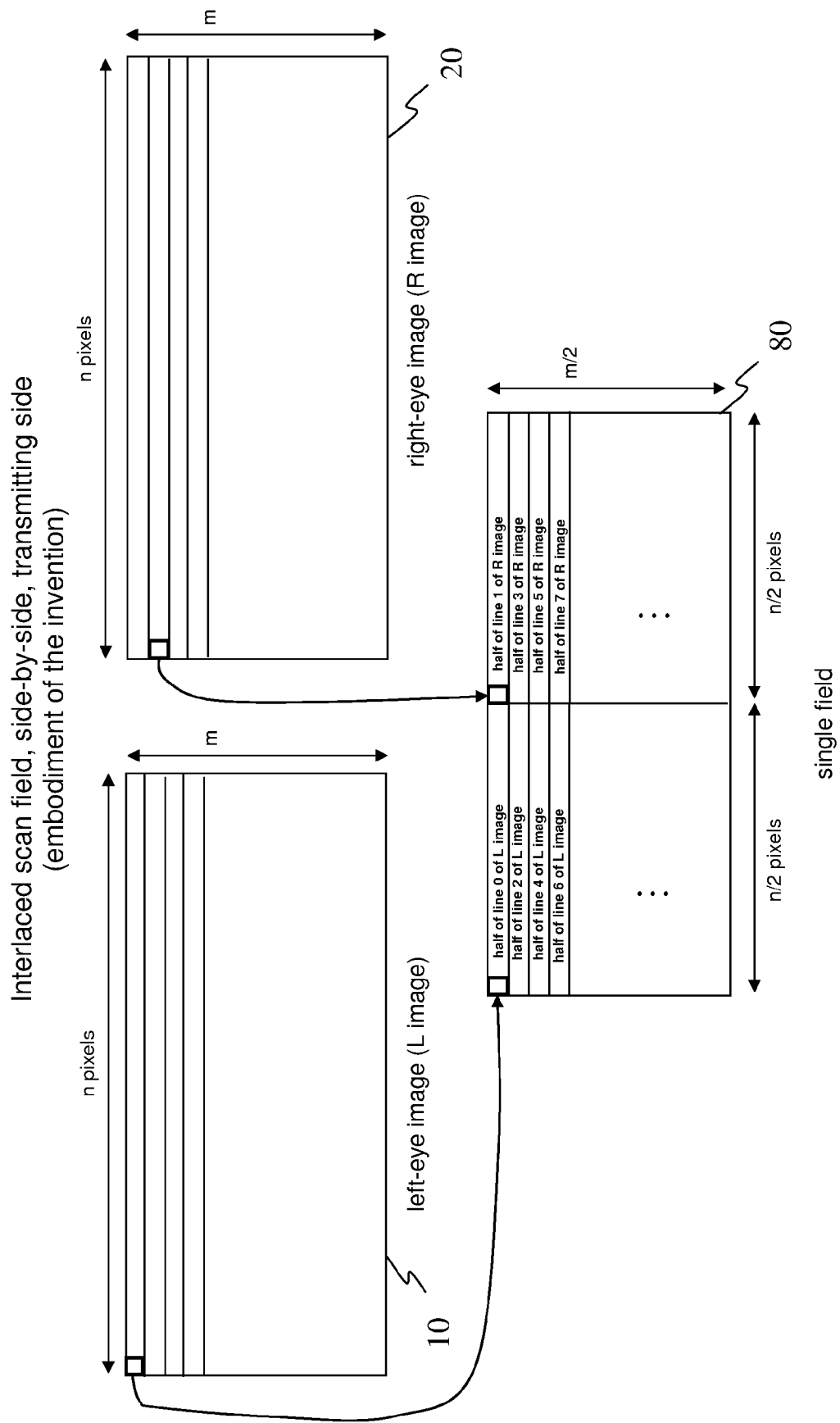
Figure 15A:
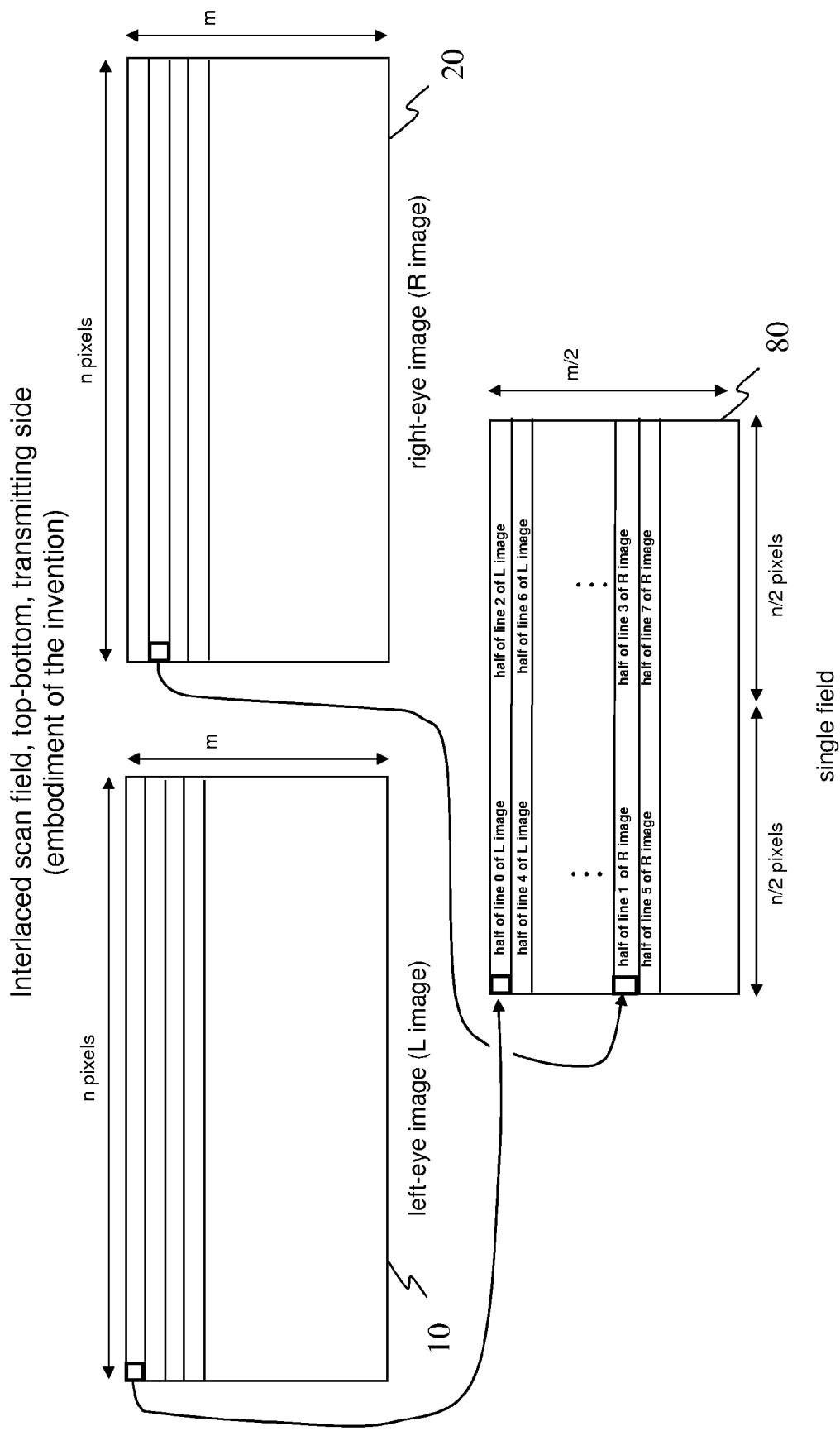
Figure 15B:
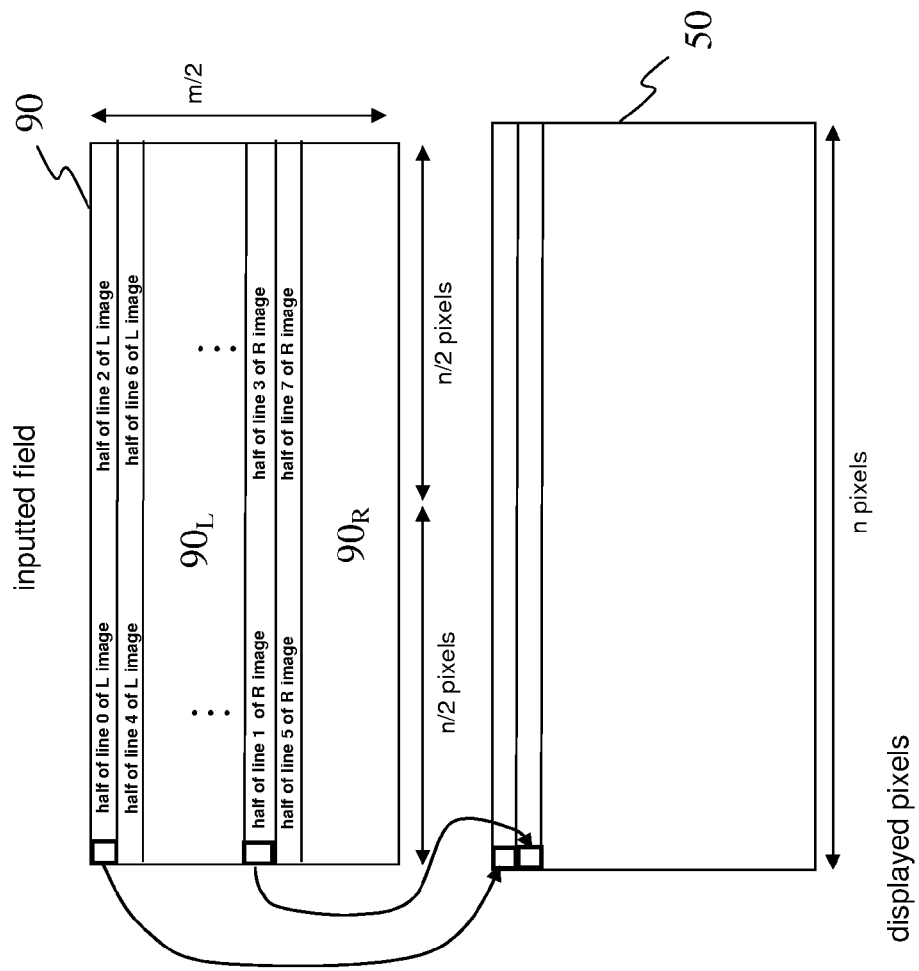
Figure 15C:
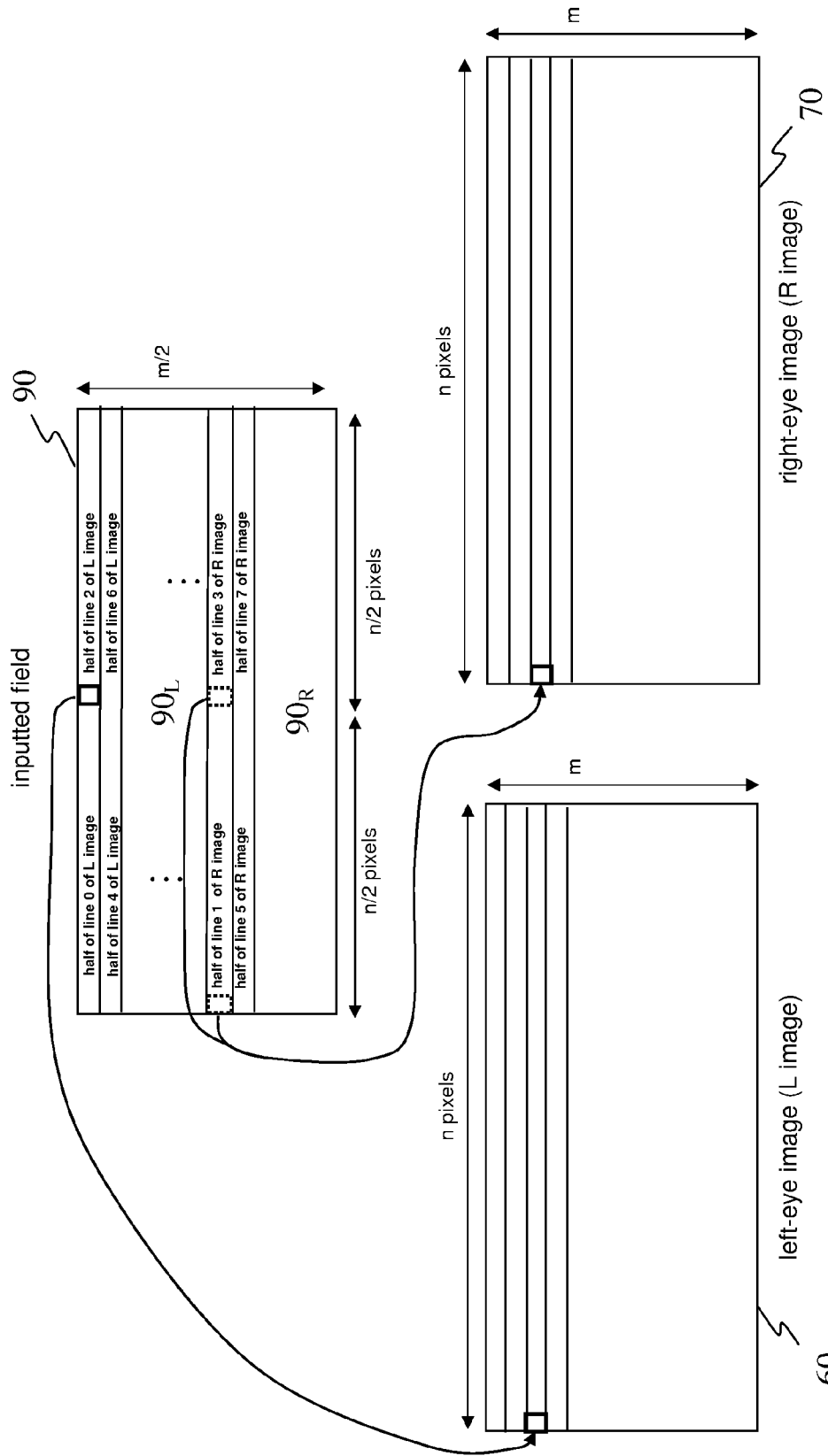

In FIGS. 13a and 15a, reference numeral 80 refers to an interlaced scan field. This field includes m/2 lines of n/2 pixels each. Likewise, in FIGS. 13b, 13c, 15b, 15c, reference numeral 90 refers to an interlaced scan field, which also includes m/2 lines of n/2 pixels each. Still in FIGS. 13b, 13c, 15b, 15c, reference numerals $90_L$ and $90_R$ refer respectively to the input left eye part and the input right eye part of the interlaced scan field 90.

Figure 12B:
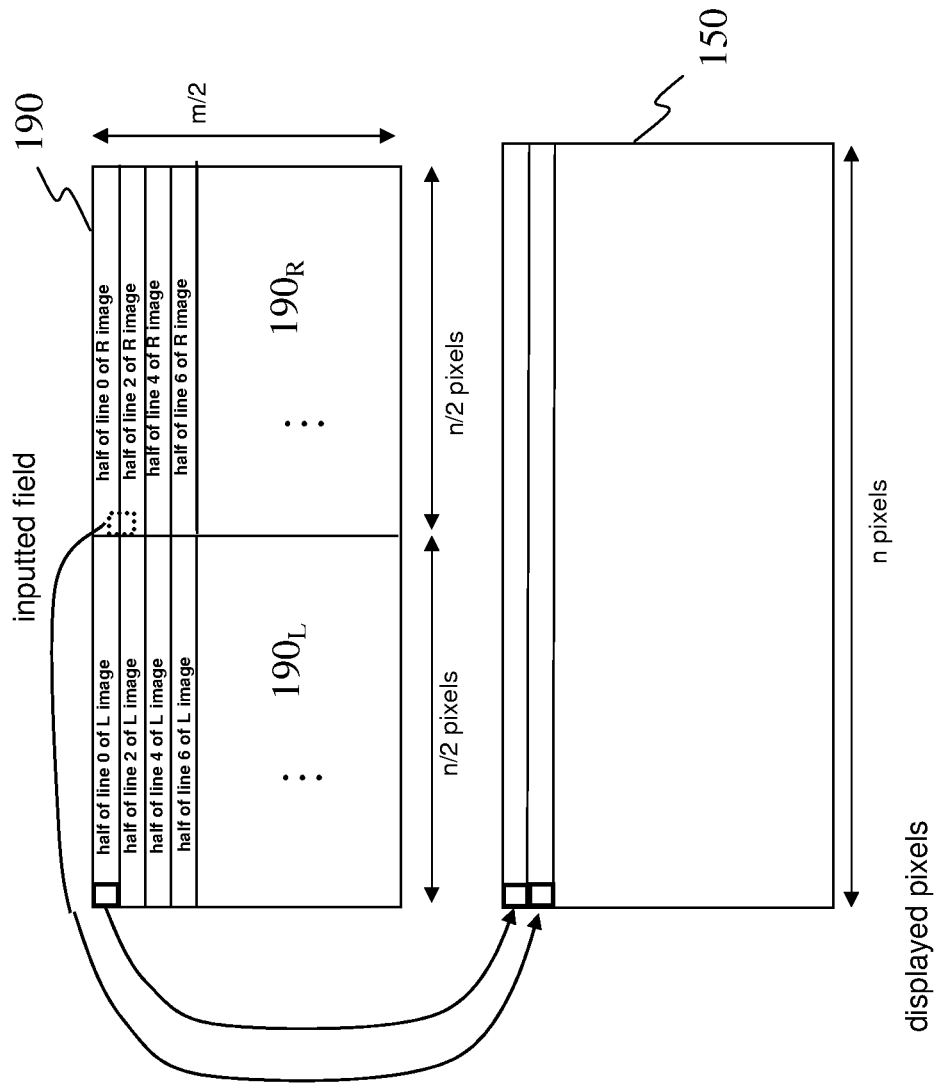
Figure 12C:
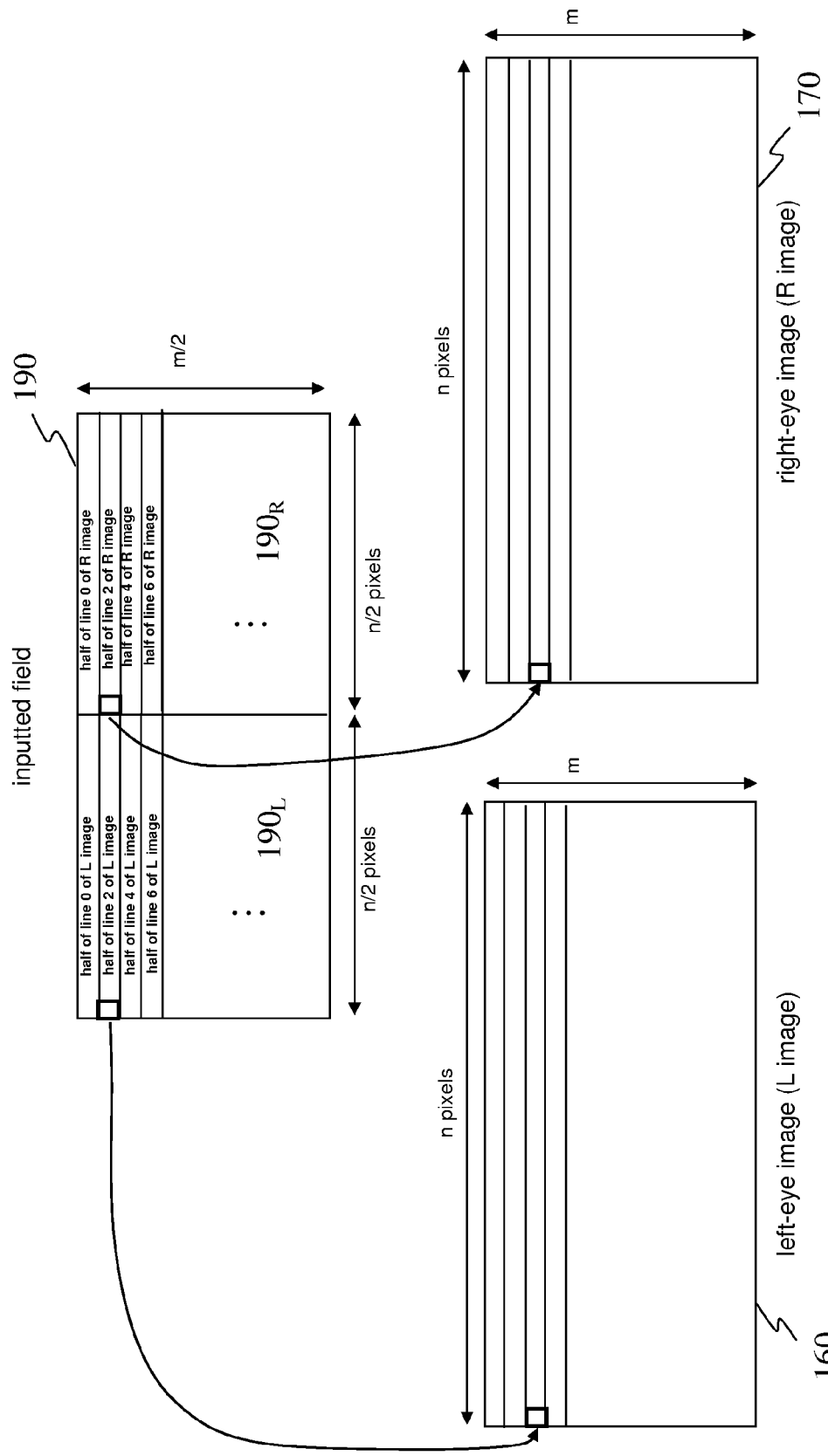
Figure 13B:
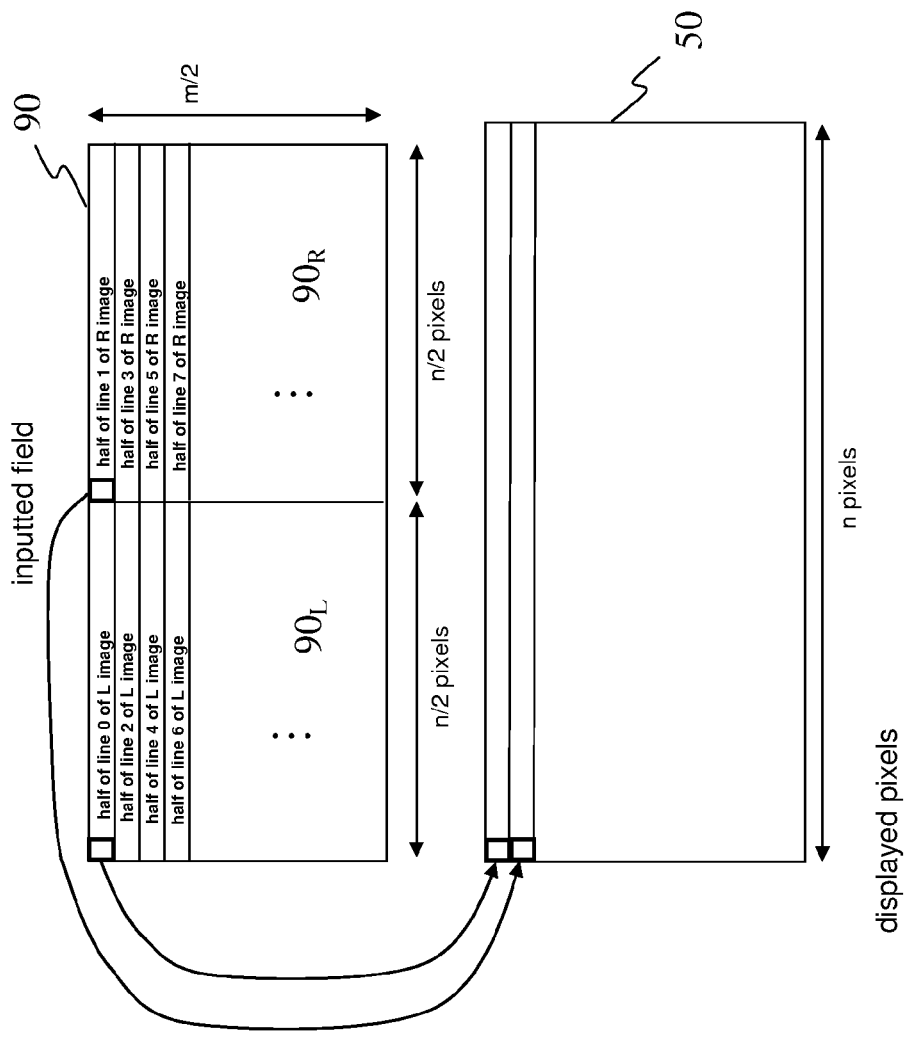
Figure 13C:
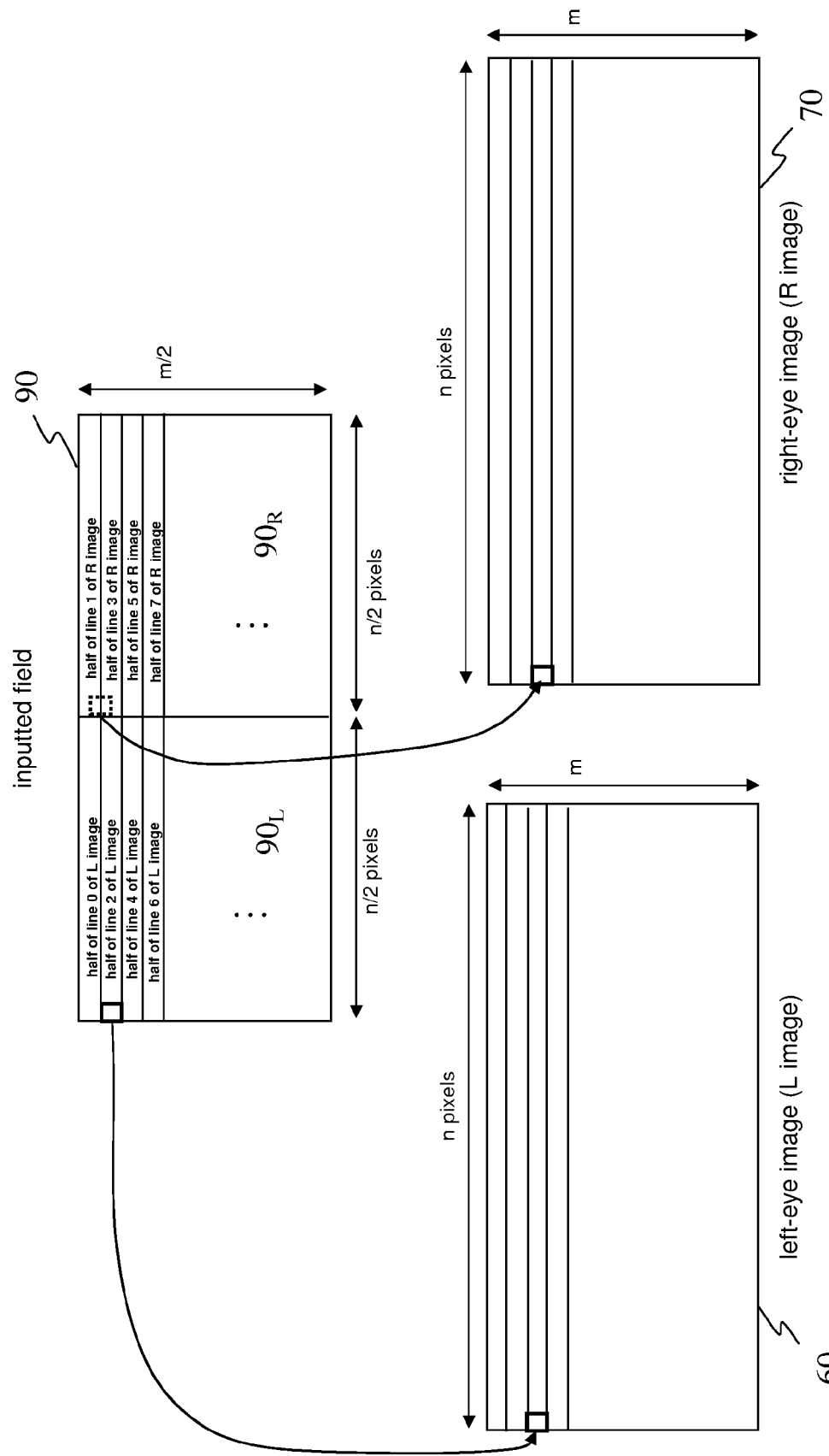

As mentioned above, comparing notably FIGS. 12a, 12b, 12c with FIGS. 13a, 13b, 13c respectively would enable a skilled person to further understand features of embodiments of the invention. In that respect, the following observations regarding these examples can be made.

FIG. 12a schematically illustrates one stage in the processing of a succession of images 110, 120 and in the creation of a stream of those images 180 for transmission ('video'). For traditional interlaced scan transmission, the images 180 of the stream typically transmit even lines (see for instance FIG. 12a) and then odd lines. Since a typical passive monitor can only utilize even lines for left-eye content or odd lines for right-eye content (or vice versa), embodiments of the invention (such as for instance the one schematically illustrated by FIG. 13a) stray from that conventional process of even-odd-even-odd-etc interlaced scanning. Therefore, for interlaced scanning, the post-processing step or the outputted field 80 which is actually transmitted is the same for each field 80 in succession (that is, the outputted field 80 for instance illustrated in FIG. 13a is the same as the field 80 outputted next), whereas the current art selects different positions (lines) for one field 180 than the next field, i.e., even lines for one field and then odd lines for the next field, or vice versa.

Moreover, given that traditional interlacing goes even-odd-even-odd, one way of understanding embodiments of the invention using interlaced scan fields 80 (such as for instance FIG. 13a) is as follows: for a first field 80, some data for even lines for the left eye 10 is transmitted in a conventional manner and then, for the right eye 20, some data from the odd lines is taken and these odd lines are transmitted in the field 80 as even lines together with the left-eye even line data. Then, on the receiving side (see for instance FIG. 13b), the monitor corrects this by displaying some of that even scan transmission data (the right eye part $90_R$) on the odd lines. For the next field, the correction process carried out by the monitor is reversed because the even lines for the left-eye are multiplexed with the odd lines for the right-eye and transmitted during the 'odd lines' field. In other words, while conventionally with interlaced scan, all even line data is expected in a first field followed by all odd line data in the next field, embodiments of the invention using interlaced scan fields may be understood as implying this correction process on the monitor side.

Furthermore, the following applies to embodiments of the invention using interlaced scanning, compared to the prior art, as it may be understood from comparing FIGS. 12b and 13b. The passive monitor processes right and left data differently within the current art (see for instance FIG. 12b) because for interlaced scanning, only even or odd lines are transmitted to the monitor. In the first case, even lines which are transmitted to the monitor can be scaled up if needed to fit the resolution of the monitor and directly displayed on the even lines of the monitor for the left eye part, whereas odd lines for the right eye part must be interpolated (such interpolation being for instance illustrated by the small dotted square depicted in the input right eye part $190_R$ on FIG. 12b) since there is no odd line data transmitted in that first field 190. Conversely, in an embodiment of the invention (see for instance FIG. 13b), the input left eye part $90_L$ is even line data which can be directly displayed (after any necessary upconversion) and the input right eye part $90_R$ is odd line data which can also be displayed directly (after any necessary upconversion). Therefore, the left and right eye data follow very similar processing paths whereas in current art they differ.

Likewise, in the existing art, when constructing a frame compatible multiplexed signal 180 (see for instance FIG. 12a), the left eye part is generated by sampling the left eye source video (either 1:2 or other method of sampling). When constructing the right eye part, the same sampling method would be used for the right eye source: that is, if the uppermost leftmost pixel of the left eye image 110 is selected to populate the uppermost leftmost pixel of the left eye part of the frame compatible signal, the uppermost leftmost pixel of the right eye image 120 would also be selected to populate the uppermost leftmost pixel of the right eye part of the frame compatible signal 180. However, in an embodiment of the invention (see for instance FIG. 13a), if the uppermost leftmost pixel of the left-eye image 10 is selected for the left eye part of the frame compatible signal 80, the uppermost leftmost pixel of the right eye image 20 would not or may not be selected for the right eye part of the frame compatible signal 80, and instead another pixel of a subsequent pixel line, for example, may be selected. Therefore, to populate the frame compatible signal 80, the selection of data from the left and right eye source 10, 20 at least partially differ and the method of selecting data may be considered spatially incongruous compared to the conventional method of selecting data.

FIGS. 16-20 will now be described to explain how the method in one embodiment of the invention enables transmission of a 3D video signal to television monitors or other display devices in a frame compatible fashion with significant advantages over traditional methods. Frame compatible defines a format which multiplexes video content for the right and left eye into a single high-definition (HD) video stream that is compatible with the existing 2D transmission, distribution and storage infrastructure. The multiplexing layout of visual data (visual data, or color data, meaning RGB, YUV or any other color definition, for instance in bits per pixel) may for instance be arranged in a side-by-side, a top-bottom, or another configuration.

The current state of stereoscopic 3D formatting technology includes straightforward frame compatible formats as well as frame sequential methods (such as those employed by Blue-Ray disks) to transmit stereoscopic 3D video content to monitors. However, given the extent of the transmission infrastructure, frame compatible 3D formatting will have to be utilized in the short term to achieve 3D video transmission. Prior to the development of this methods and systems according to the invention, side-by-side and top-bottom 3D video signals were created by simply selecting the same content from the left source as the right source, compressing and appending these data into one HD video stream. The existing methods are straightforward from a post-processing standpoint (i.e. on the transmitting side, where post-processing refers to the processing after capturing or generating the images but before transmitting them) since it can be performed in synchronization for both the left and right source and it combines two traditional HD workflows into one stereoscopic 3D flow without much alteration. From the monitor standpoint, 3DTV monitors received a given 3D stereoscopic signal and are required to interpolate for any missing data that is necessary to recreate a stereoscopic image.

FIG. 20 explains some of the notations used in FIGS. 16-19.

Figure 16:
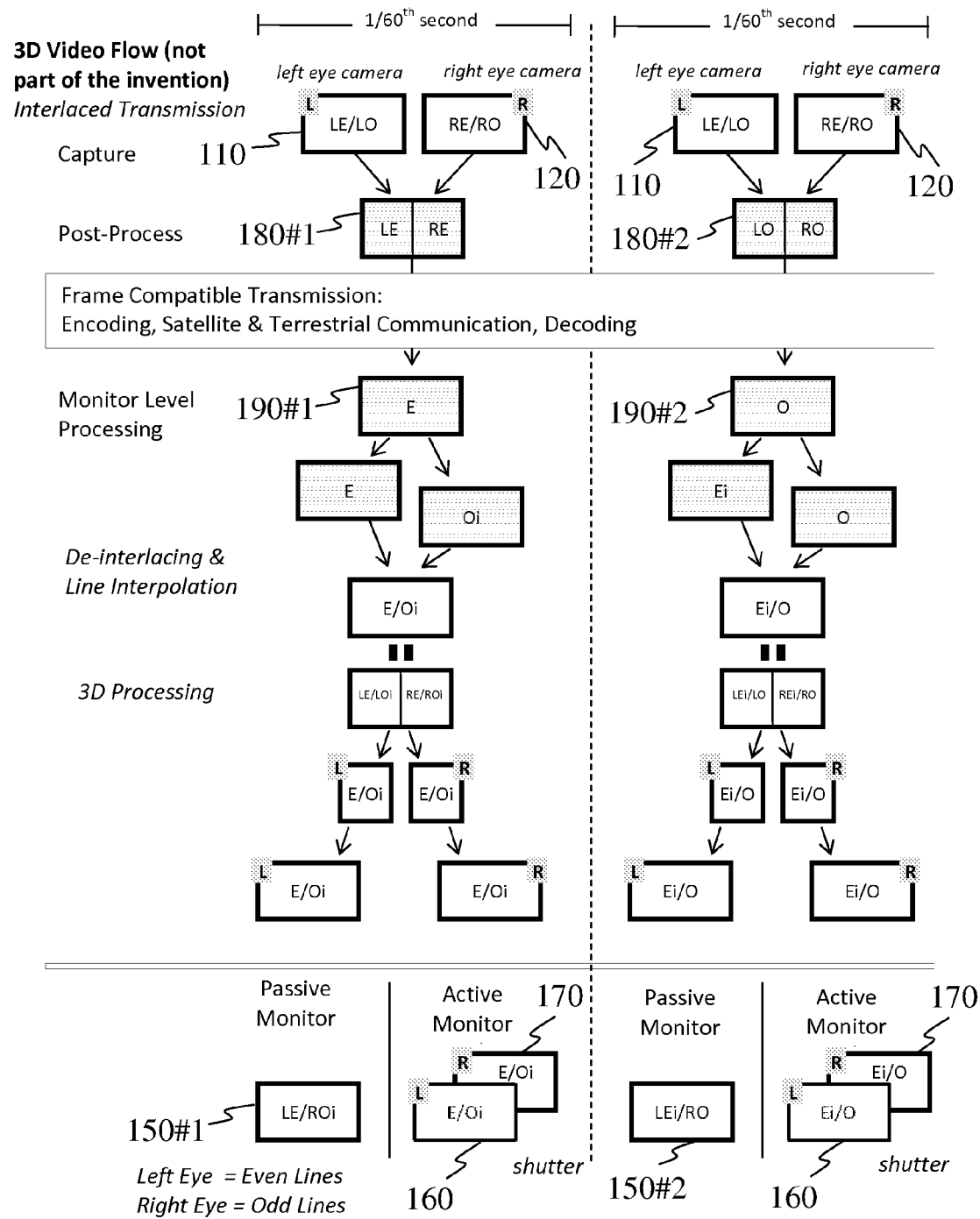
FIG. 16 is a schematic high-level overview of an existing 3D video flow from the capture of the left- and right-eye images to the rendering of 3D content on passive or active monitors, in order to illustrate the background of the invention.

FIG. 16 provides a schematic high level overview of some of the possible steps involved in the prior art stereoscopic video flow from production to display. While some of the final details of this flow may vary due to individual hardware algorithms, FIG. 16 can demonstrate a framework for how the content could be handled for transmission. In the capture step ("Capture"), two cameras (the "left eye camera" and the "right eye camera") are used to generate 3D source video content. Each camera corresponds to either the left or right eye perspective of the content being filmed. Compared to traditional HD video capture, this produces twice as much visual data—thus the need to perform additional processing to render the video compatible with hardware downstream.

The post-processing step ("Post-Process") can consist of processing and multiplexing performed in many devices, in addition to content editing, re-coloring, etc. that are performed post-production. Specific to stereoscopic 3D, the left and right source content 110, 120 are compressed either vertically or horizontally (or both) and reduced in resolution so that they can be packaged in a frame compatible layout. A number of methods are possible for reducing the resolution of the video stream. The lower resolution source content from the left camera is appended to the lower resolution of the source from the right camera to produce a full-frame traditional HD signal at the specified resolution (typically either 1280×720 or 1920×1080). In addition, if the signal is being transmitted as an interlaced scan field (as opposed to progressive scan frame) each frame (typically 1/60th of a second in the U.S.) is stripped by half the vertical lines into an interlaced scan field 180. In the traditional stereoscopic workflow, the resulting signal, in the example depicted in FIG. 16, is that the even lines from the left eye source (illustrated by the letters "LE" on FIG. 16, wherein LE stands for "left even") are appended with the even lines of the right eye source (illustrated by the letters "RE" in FIG. 16, wherein RE stands for "right even") to form interlaced field 180#1; similarly, odd lines from the left eye camera (illustrated by the letters "LO" in FIG. 16, wherein LO stands for "left odd") and odd lines from the right eye camera (illustrated by the letters "RO" in FIG. 16, wherein RO stands for "right odd") are combined to create interlaced field 180#2.

This post-processing illustrated at the top of FIG. 16 may be similar to the processing illustrated in FIG. 12a.

Since this stereoscopic signal is now in a frame compatible format, and by definition is compatible with traditional hardware components necessary for video distribution, it may be transmitted in the same manner as 2D HD video content is transmitted. This transmission stage may consist of many processing steps including encoding, modulation, encryption, amplification, decoding in television set-top-boxes, etc. (label "Frame Compatible Transmission: Encoding, Satellite & Terrestrial Communication, Decoding" on FIG. 16).

If the transmitted signal is an interlaced scan consisting of fields 190#1, 190#2 (or half frames), the monitor performs de-interlacing to reconstitute a full frame for display. As illustrated in FIG. 16, this interpolation process results in each frame for each eye consisting of half original source data and half interpolated data (as illustrated by the labels "E" and "Oi" for the first period and the labels "Ei" and "O" for the second period, on FIG. 16).

Ultimately, for stereo 3D video content, the monitor that receives the signal is currently responsible for de-multiplexing the stereo 3D images from the frame compatible signal so that the monitor can display the content in the proper way to create a 3D effect. The monitor must also 'stretch' both the left and right eye stream to reconstitute full resolution images. This is illustrated in the 3D processing section of FIG. 16. The data available for any type of monitor, after several processing steps and transmission is a full frame left eye stream consisting of original even lines (after stretching) and interpolated odd lines (illustrated by the label "LE/LOi" on FIG. 16, left-hand side), and likewise a full frame right eye stream consisting of original even lines and interpolated odd lines for frame #1 (illustrated by the label "RE/ROi" on FIG. 16, left-hand side).

For frame #2 (1/60th of a second later), the left eye stream consists of original odd lines (after stretching) and interpolated even lines (illustrated by the label "LEi/LO" in FIG. 16, right-hand side), and likewise the right eye stream consists of original odd lines and even interpolated lines (illustrated by the label "REi/RO" in FIG. 16, right-hand side).

FIG. 16 also shows how these video streams can be utilized by both a passive (statically polarized) monitor technology and an active (glasses-based shuttering) monitor technology to create a stereoscopic effect. As shown, the active monitor displays all the information that is generated during monitor level processing in a Left-Right shuttering pattern (as illustrated in a similar manner in FIG. 12c), while the passive monitor—as a result of its design and construction—can only display half (as illustrated in a similar manner in FIG. 12b). Since even lines are polarized for the left eye in this example, the passive monitor and active monitor must display original even lines for the left eye and interpolated odd lines for the right eye for frame 150#1 (illustrated by the label "LE/ROi" in FIG. 16, left-hand side, bottom left; labels "E/Oi" in FIG. 16, left-hand side, bottom right); which is then reversed for frame 150#2 (illustrated by the label "LEi/RO" in FIG. 16, right-hand side, bottom left; labels "Ei/O" in FIG. 16, right-hand side, bottom right) for both active and passive display technologies.

Figure 17:
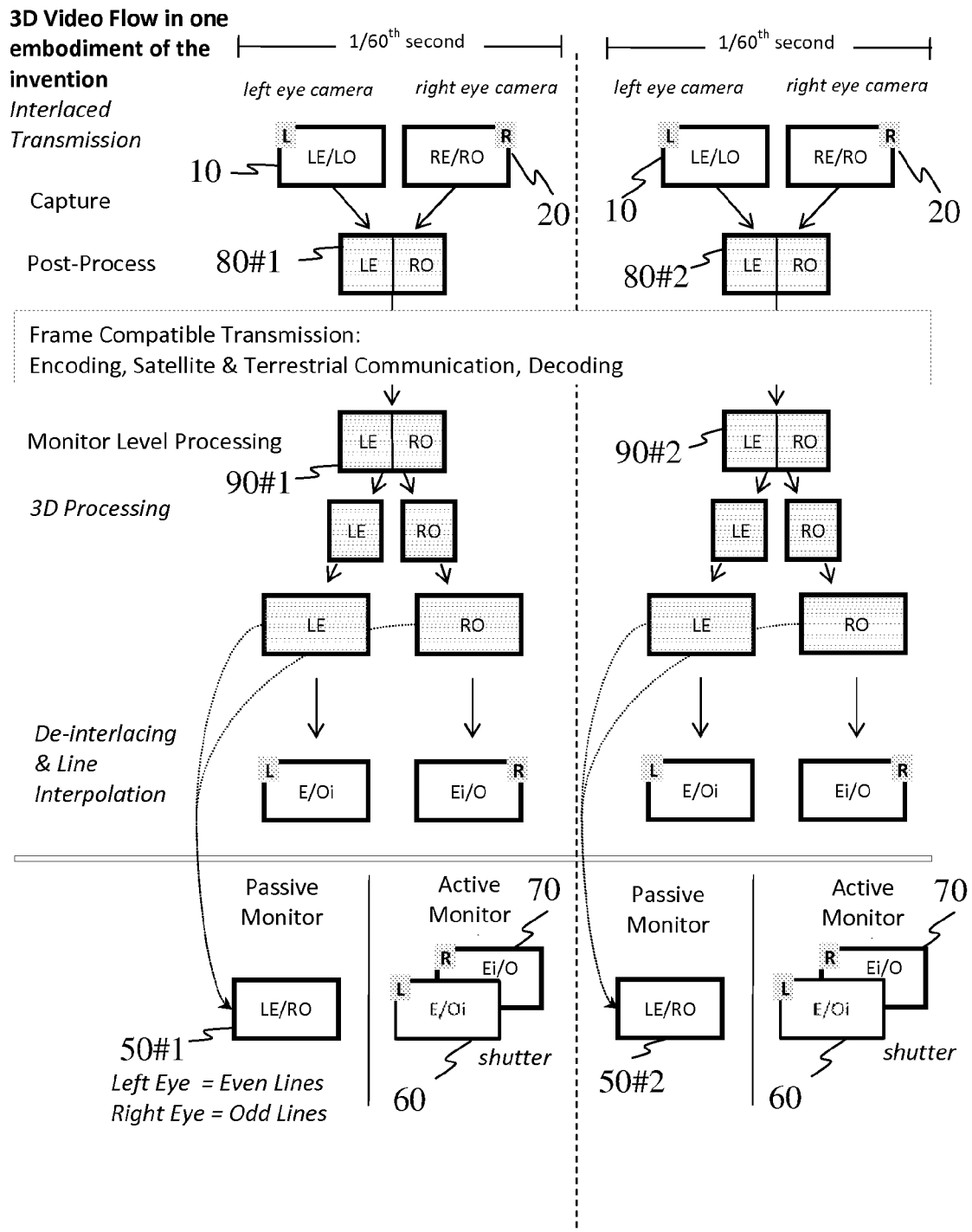
FIG. 17 is a schematic high-level overview of a 3D video flow from the capture of the left- and right-eye images to the rendering of 3D content on passive or active monitors, in one embodiment of the invention.

FIG. 17 provides a high level example of the method in one embodiment of the invention, in side-by-side manner for interlaced scan from left and right source video to display monitor technology. The capture process remains the same as traditional stereoscopic 3D workflows. The post-processing stage is handled differently for stereoscopic 3D source content with this method. There are some differences in the way interlacing is performed on source content. For interlaced scan video, rather than compressing and multiplexing corresponding scan lines from the left and right source, this method compresses the left and right source 10, 20 and captures alternating scan lines: either 'even' from left and 'odd' from right (LERO) or vice versa. The data from alternating scan lines is then encapsulated as (i.e., arranged into) a single interlaced scan field 'even' or 'odd' 80#1, 80#2. This method, illustrated in FIG. 17, shows the distinct difference of doing interlacing alongside the multiplexing process, so that the end result of post-processing is what appears to be a traditional interlaced signal, but contains left eye content appended to right eye content in a spatially incongruous manner (labels "LE|RO" on FIG. 17).

Figure 18:
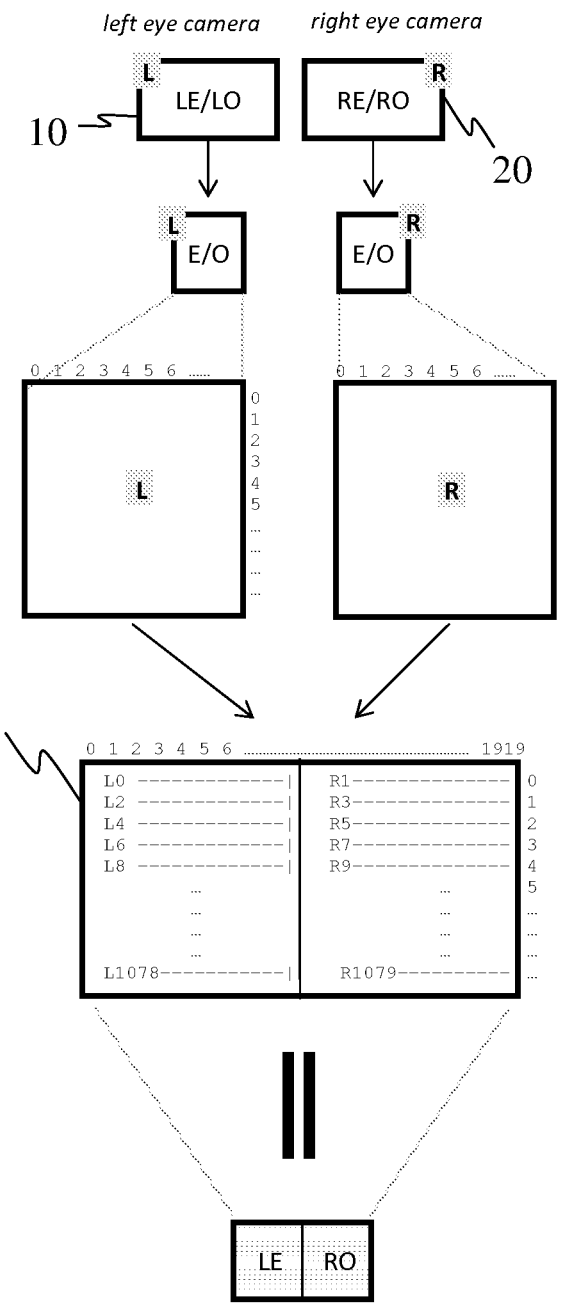
FIG. 18 is a schematic flow chart of a post-processing method in one embodiment of the invention.

FIG. 18 shows a step-by-step detail of how this post-processing function may be performed in one embodiment of the invention, which may be similar to the method illustrated in FIG. 13a. By indexing the video data by pixels, pixels from line 0 of the left image are appended with line 1 of the right image—as opposed to line 0 of the left appended with line 0 of the right in a traditional side-by-side multiplexed interlaced signal. The end result being a frame 80 consisting of 1920 columns of pixels, but only 540 vertical rows—half the normal vertical resolution, thus making up an interlaced scan field 80. Furthermore vertical or horizontal compression, depending on whether a frame compatible layout of side-by-side or top-bottom is being utilized, should be performed before the interlacing process to maximize the amount of data available to produce high quality compression (and ultimately a higher quality product after 'stretching' performed in the monitor). The corresponding first step in the diagram in FIG. 18 shows the left eye and right eye video streams being compressed in resolution first either vertically, horizontally, or both (horizontally in this case since the intended frame compatible layout is side-by-side).

This method produces a frame compatible signal, so that the stereoscopic 3D signal is transmitted through traditional terrestrial and satellite network infrastructure for video distribution in the process as traditional HD video streams. The monitor level processing changes somewhat however to maximize the signal specifically for the technology used to display the signal. With this embodiment of the invention, monitor process flow is re-oriented with 3D signals in mind to limit the amount of processing and improve the efficiency of data transmission. As shown in FIG. 17, rather than performing stereoscopic 3D processing after de-interlacing (as done for conventional methods in FIG. 18), the 3D processing is done initially to de-multiplex the signal from the corresponding frame compatible layout. The left eye video content can be identified and split from the right eye video content and then correspondingly 'stretched' to produce undo the compression necessary for stereo 3D multiplexing in that frame compatible format.

This de-multiplexing and expansion process within passive monitor technology is schematically illustrated in FIG. 19, in one embodiment of the invention, which may be similar to the method illustrated in FIG. 13*b*. The same image 80, 90 produced by the method in the post-processing stage (FIGS. 18, 13*a*) may be received by the monitor (FIGS. 19, 13*b*). Pixel indices show that the monitor, configured according to this embodiment of the invention, recognizes that the right eye content $90_R$, having been separated from the left content and stretched to a 1920 horizontal resolution, as odd lines (#1-1079) and correspondingly the left eye content $90_L$ recognized as even lines (#0-1078). This results in a full resolution interlaced field for the left eye and a full resolution interlaced field for the right eye which are spatially different (offset by one pixel) and no interpolated data at the end of the 3D processing phase.

At this point in the processing algorithms, the processing done in the passive monitor differs from processing done in the active monitors because of the way each monitor technology displays stereo 3D content—specifically how much video data, or resolution of the left and right eye content, the monitor can display. The passive monitor, by nature and construction, may only be capable of displaying left eye content on even lines of the monitor and right eye content on the odd lines of the monitor, or vice versa. At the end of the stereo 3D processing step (in FIGS. 17 and 19), the monitor has an interlaced field of even lines for the left eye and an interlaced field of odd lines for the right eye. Since that is the exact data that the monitor can display, additional line interpolation steps can be skipped in the passive monitor technology. A simple line-de-interlacing, shown as the final step in FIG. 19, simply combines left eye content and right eye content in a line-interleaved configuration to create the illustrated frame 50, where each pixel is in its native horizontal row (L0 in monitor line 0, R1 in monitor line 1, etc. ...). This process is repeated for each frame 50, so that the passive monitor displays no interpolated data and may make full use of all the data being transmitted to it, without additional processing steps.

For active display monitors (see also FIG. 13*c*), which can display full frames for the left and right eye in shuttering pattern, the additional step of de-interlacing would be required if it is desired to take full advantage of the monitor's possible resolution. In this case, it would still be beneficial to do 3D processing (de-multiplexing and stretching to uncompress frame compatible layout) before de-interlacing, and simply take the LE full resolution interlaced field and produce interpolated data for the even lines; conversely even interpolated data for the RO full resolution interlaced field. This would be similar to conventional stereo 3D transmission methods for active monitor displays, in terms of processing required and the visual result. A distinction on which lines (even or odd) of the left and right eye image were interpolated would exist as a result of this method and system, but the amount of interpolated data and quality of video for practical purposes would be identical.

The method shown in FIGS. 17-19 has been designed around an interlace scan signal resolution of 1920×1080 at 30 frames per second (1080i), but is applicable to any video resolution using interlace or progressive scan. The interlacing steps in both the post-processing and monitor processing stages may be removed for progressive transmission standard. In addition, this method may be applied to a side-by-side, top-bottom, or any frame compatible layout, but transmits a different configuration of visual data than existing frame compatible formats. Another application of this embodiment of packaging the stereoscopic 3D signal in the most convenient way possible for monitor display technology would be a top-bottom configuration of LE/RO for progressive scan transmission (similar to FIGS. 11*a*-11*c*). Furthermore, the spatial order of processing depends on the static construction monitor—whether the initial assumption of even lines being statically polarized by passive monitor displays for the left eye is valid in all cases. However, the reverse configuration (i.e., LORE instead of LERO) would be another possible embodiment of this methods and systems of the invention.

Different video modes may be used in embodiments of the invention. In one embodiment of the invention, the mode is downconverted from 1080 (i.e., a resolution of 1920×1080 pixels) to 720 (i.e., a resolution of 1280×720 pixels) at the transmitting side (source side) and then upconverted to 1080 at the receiving side (monitor side). In another embodiment, the mode remains 1080 at the transmitting side (source side) and also remains 1080 at the receiving side (monitor side). In yet another embodiment, the mode remains 720 at the transmitting side (source side) and is upconverted to 1080 at the receiving side (monitor side). In yet another embodiment, the mode is upconverted from 720 to 1080 at the transmitting side (source side) and remains 1080 at the receiving side (monitor side).

Figure 11A:
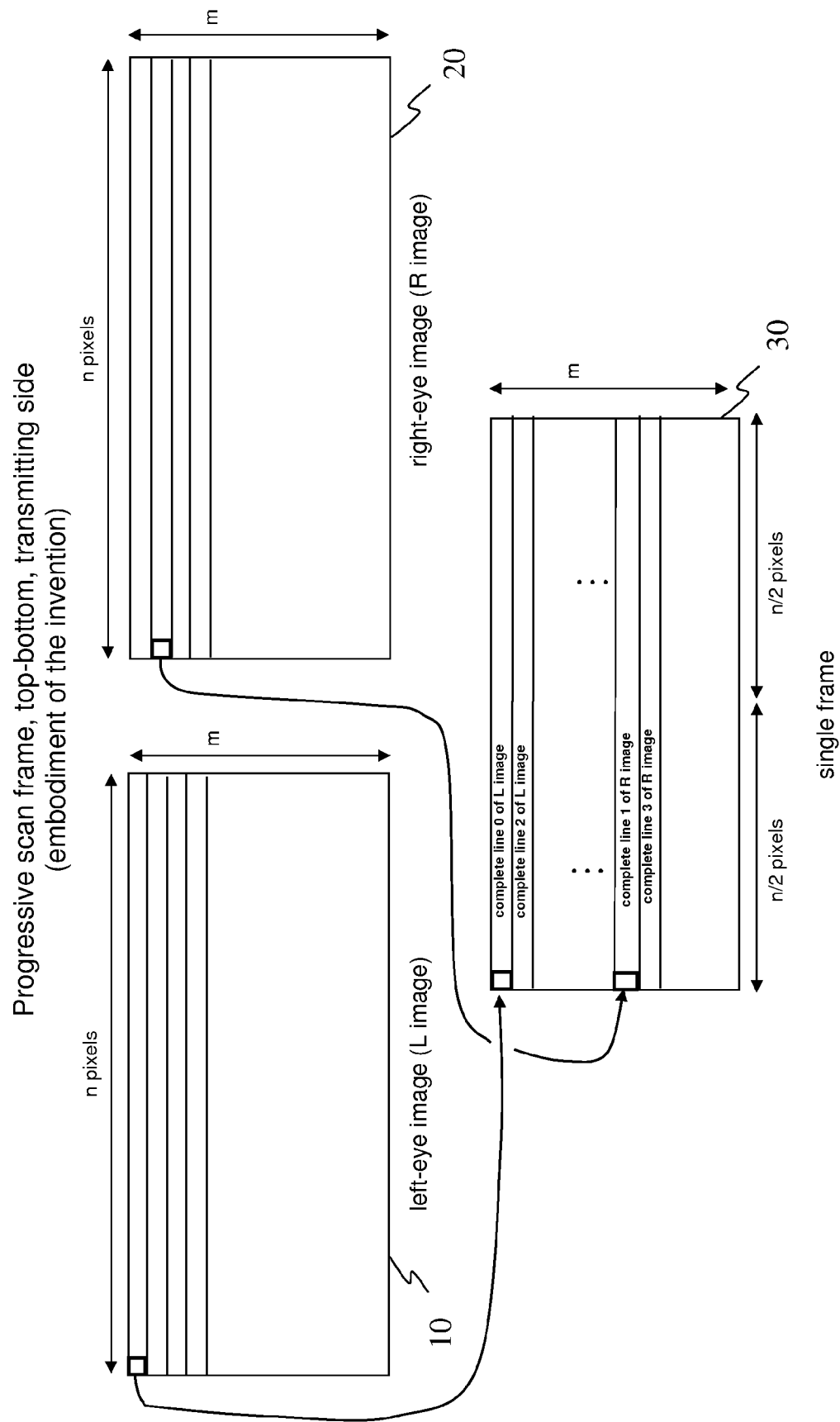
Figure 11B:
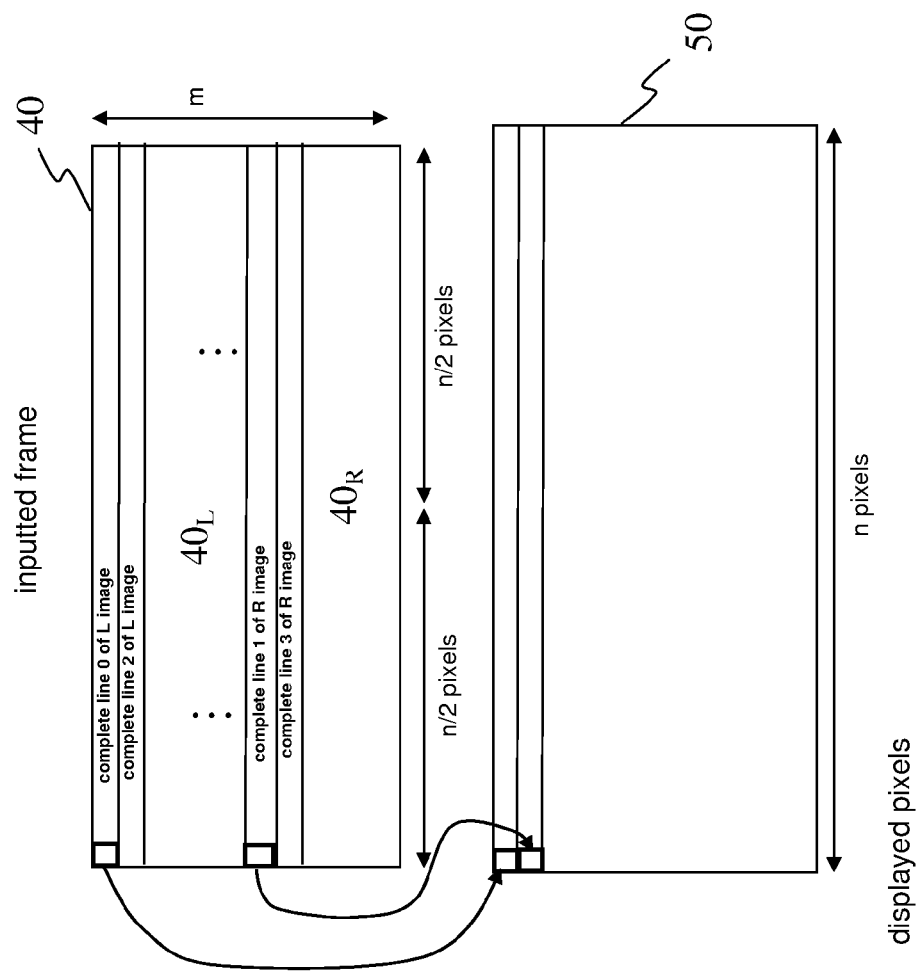
Figure 11C:
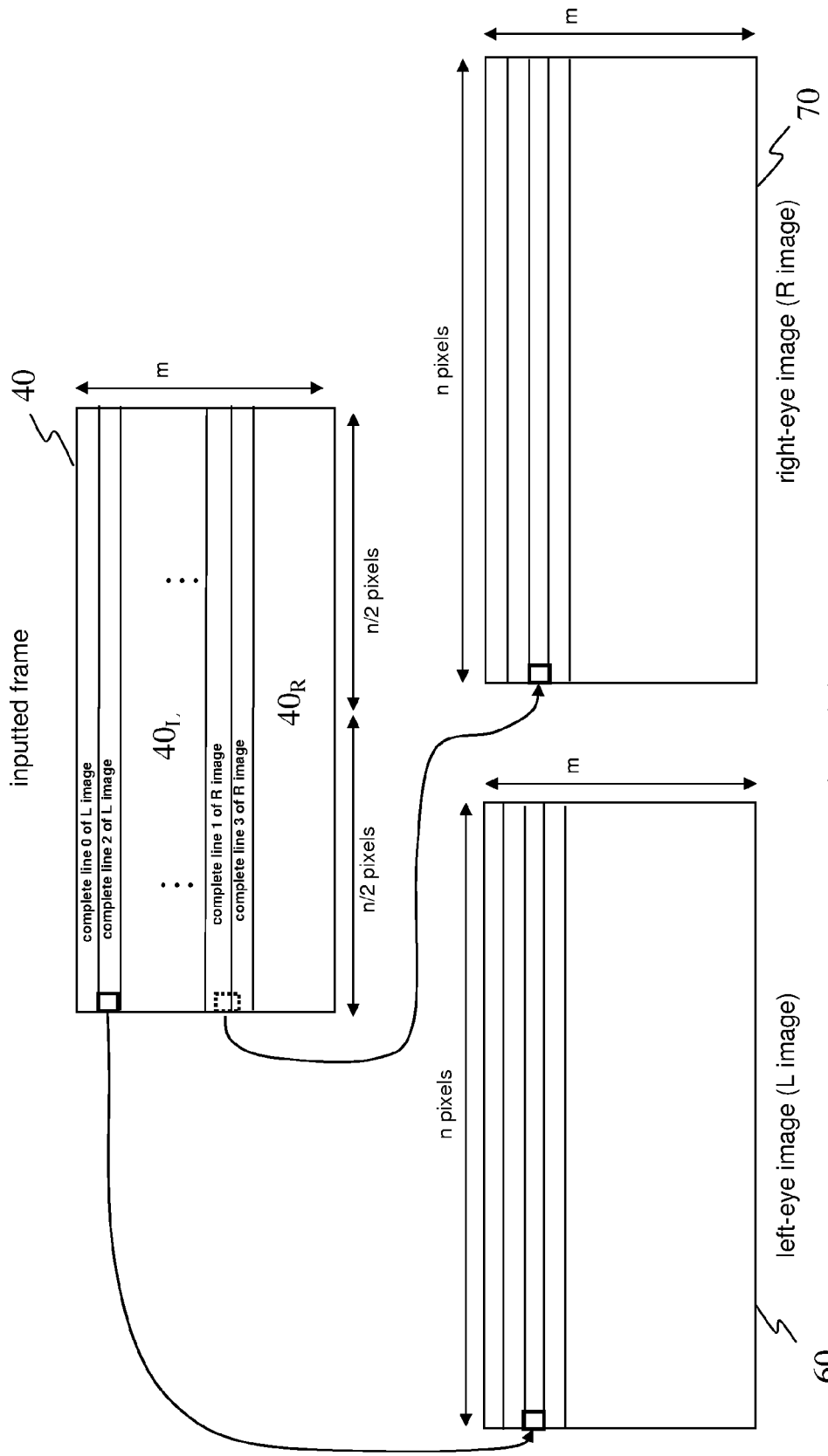

In one embodiment, a 1080p video mode (i.e., progressive scan with resolution of 1920×1080 pixels) is used with top-bottom multiplexing (see for instance FIG. 11*a*). Such an embodiment is highly efficient since the passive monitor may not be required to perform any interpolation processing (see for instance FIG. 11*b*). In comparison, a 1080i video mode (i.e., interlaced scan with resolution of 1920×1080 pixels) used with side-by-side multiplexing in a conventional manner (as for instance illustrated in FIG. 12*a*) would require up to four times more interpolation processing (see for instance FIG. 12*b*, especially when data from the input right-eye part $190_R$ is used).

During testing of 3D content transmission as well as a close examination of 3D display devices, it was observed that for certain signal types, display devices had to perform a significant amount of video processing—de-interlacing, motion compensation, stretching, etc.—in order to take the frame compatible signal and display a stereoscopic 3D image. Video processing and interpolation of missing data results in video artifacts and ultimately lower quality video content. Further investigation showed that due to how certain technologies create the stereoscopic effect, some data in current frame compatible formats is not used and the monitor instead displays interpolated data that is incorrectly extrapolated. Specifically, passive monitors display left eye and right eye images on alternating lines statically—as opposed to active monitors which display left and right eye images sequentially—and as a result of existing interlaced transmission formats, passive monitors can only display half original and half interpolated data at any given time. A motivation behind the creation of the methods and systems in embodiments of the invention therefore were to create a transmission format which optimized data transmission in the end-to-end chain from post-process studio to television monitor; so that the monitor processing and artifacts are reduced and the ultimate stereoscopic video quality is higher.

Benefits of the method and systems according to some embodiments of the invention are greater data efficiency as well as reduced processing required at the monitor. The combination of these two advantages results in a higher quality video signal, as produced by passive monitor technology, since there is no need to create or display any interpolated data at monitor. Passive monitors are primarily benefitted from this formatting scheme in interlaced scanning, since active monitors must display some transmitted and some interpolated data in order to reconstruct full frames; however, it does not disadvantage active monitor technology.

Methods and systems in embodiments of the invention may be incorporated into existing 3D video production processes and the existing video transmission chain immediately. Since those are frame compatible methods, video data in this format may be capable of compression and transmission with existing hardware. From an implementation standpoint, only monitors (or set-top boxes) and the post-process multiplexing devices would have to be upgraded to support this data formatting method. Most likely these updates may be in the form of software or firmware modifications for hardware currently deployed.

The physical entities according to the invention or according to embodiments thereof, including the systems, the input units, the multiplexing units and the displaying units may comprise or store computer programs including instructions such that, when the computer programs are executed on the physical entities, steps and procedures according to embodiments of the invention are carried out. The invention also relates to such computer programs for carrying out methods according to the invention, and to any computer-readable medium storing the computer programs for carrying out methods according to the invention.

Where the terms "system," "input unit," "multiplexing unit" and "displaying unit" are used herewith, no restriction is made regarding how distributed these elements may be and regarding how gathered elements may be. That is, the constituent elements of a "system," "input unit," "multiplexing unit" and "displaying unit" may be distributed in different software or hardware components or devices for bringing about the intended function. A plurality of distinct elements may also be gathered for providing the intended functionalities.

Any one of the above-referred elements of a system, input unit, multiplexing unit and displaying unit may be implemented in hardware, software, field-programmable gate array (FPGA), application-specific integrated circuit (ASICs), firmware or the like.

In further embodiments of the invention, any one of the above-mentioned and/or claimed input unit, multiplexing unit and displaying unit, etc. is replaced by input means, multiplexing means and displaying means, etc. respectively, for performing the functions of the input unit, multiplexing unit and displaying unit, etc.

In further embodiments of the invention, any one of the above-described procedures or steps may be implemented using computer-readable instructions, for example in the form of computer-understandable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims. For instance, statements associating left-eye content with even lines and right-eye content with odd lines should by no means be construed as limiting the invention or its embodiments in the sense that, similarly, left-eye content may be associated with odd lines and right-eye content may be associated with even lines.

What is claimed is:

1. Method for processing stereoscopic video data for transmission, the method including
   being inputted with a left-eye image and a right-eye image, wherein each of the left-eye image and the right-eye image includes pixels, and each of the pixels is associated with color data; and
   multiplexing the left-eye image and the right-eye image into a single frame or field by
      associating, with each of a set of positions selected from the left-eye image and each of a set of positions selected from the right-eye image, color data, wherein the color data associated with a selected position is derived either from the color data of the pixel identified by the selected position or from the color data of a group of pixels centered on the selected position; and
      arranging the color data associated with the selected positions from the left-eye image and the color data associated with the selected positions from the right-eye image into the single frame or field;
   wherein the set of positions selected from the left-eye image at least partially differs from the set of positions selected from the right-eye image, and wherein less than all positions are selected from the left-eye image and less than all positions are selected from the right-eye image in forming the single frame or field.

2. Method of claim 1, wherein each of the pixels of the left-eye image and of the right-eye image is identified by a pair of coordinates, a pair of coordinates being here referred to as pixel address, and wherein each selected position is a pixel address.

3. Method of claim 1, wherein none of the positions selected from the left-eye image is the same as a position selected from the right-eye image.

4. Method of claim 3, wherein the set of positions selected from the left-eye image and the set of positions selected from the right-eye image include positions selected from within pixels from a first set of pixels rows from the left-eye image and positions selected from within pixels from a second set of pixels rows from the right-eye image, wherein none of the rows of the first set is that same as a row of the second set.

5. Method of claim 4, wherein the set of positions selected from the left-eye image and the set of positions selected from the right-eye image include one of:
   a set of positions selected from within pixels from the even scan lines of the left-eye image and a set of positions selected from within pixels from the odd scan lines of the right-eye image; and
   a set of positions selected from within pixels from the odd scan lines of the left-eye image and a set of positions selected from within pixels from the even scan lines of the right-eye image.

6. Method of claim 5, wherein the set of positions selected from the left-eye image and the set of positions selected from the right-eye image include one of:
   a set of positions selected from half of the pixels from the even scan lines of the left-eye image and a set of positions selected from half of the pixels from the odd scan lines of the right-eye image; and
   a set of positions selected from half of the pixels from the odd scan lines of the left-eye image and a set of positions selected from half of the pixels from the even scan lines of the right-eye image.

7. Method of claim 5, wherein the set of positions selected from the left-eye image and the set of positions selected from the right-eye image include one of:
   a set of positions selected from all the pixels from the even scan lines of the left-eye image and a set of positions selected from all the pixels of the odd scan lines from the right-eye image; and
   a set of positions selected from all the pixels from the odd scan lines of the left-eye image and a set of positions selected from all the pixels from the even scan lines of the right-eye image.

8. Method according to claim 1, wherein the left-eye image and the right-eye image are multiplexed into a single field, and the single field is an interlaced scan field.

9. Method according to claim 1, wherein the left-eye image and the right-eye image are multiplexed into a single frame, and the single frame is a progressive scan frame.

10. Method according to claim 1, wherein arranging the color data associated with the selected positions from the left-eye image and the color data associated with the selected positions from the right-eye image into the single frame or field is carried out in any one of a side-by-side manner, a top-bottom manner, a line-by-line manner, and a checkerboard manner.

11. Method for processing stereoscopic video data formatted into a succession of frames or fields and for displaying the processed stereoscopic video data on a video display device suitable for use with passive glasses, the video display device being here referred to as passive monitor, the method including
   being inputted with a frame or field, wherein the frame or field includes pixels and each of the pixels is associated with color data; and
   displaying simultaneously, on the passive monitor, pixels to be viewed by the left eye and pixels to be viewed by the right eye of a user bearing passive glasses suitable for use with the passive monitor, wherein each of the displayed pixels is associated with color data;
   wherein
   the color data associated with the displayed pixels to be viewed by the left eye are derived from one part of the inputted frame or field, that part being referred to here as input left eye part, wherein the input left eye part comprises less than all pixels of the inputted frame or field;
   the color data associated with the displayed pixels to be viewed by the right eye are derived from another part of the inputted frame or field, that part being referred to here as input right eye part, wherein the input right eye part comprises less than all pixels of the inputted frame or field; and
   referring, in sequence from the leftmost, uppermost pixel to the rightmost, lowermost pixel, to the displayed pixels to be viewed by the left eye as pixels $DL_i$, wherein i is an integer with $1 \leq i \leq p$,
   referring, in sequence from the leftmost, uppermost pixel to the rightmost, lowermost pixel, to the displayed pixels to be viewed by the right eye as pixels $DR_i$, wherein i is an integer with $1 \leq i \leq p$,
   referring, in sequence from the leftmost, uppermost pixel to the rightmost, lowermost pixel, to the pixels of the input left eye part as pixels $InL_j$, wherein j is an integer with $1 \leq j \leq q$,
   referring, in sequence from the leftmost, uppermost pixel to the rightmost, lowermost pixel, to the pixels of the input right eye part as pixels $InR_j$, wherein j is an integer with $1 \leq j \leq q$,
   for at least some values of i, the color data associated with displayed pixel $DL_i$ is derived from the color data of one or more of pixels $InL_j$ in the same manner as the color data associated with displayed pixel $DR_i$ is derived from the color data of one or more of pixels $InR_j$, and
   wherein the input left eye part and the input right eye part do not overlap in the inputted frame or field.

12. Method of claim 11, wherein displaying simultaneously, on the passive monitor, pixels to be viewed by the left eye and pixels to be viewed by the right eye of a user bearing passive glasses suitable for use with the passive monitor includes one of:
   displaying pixels to be viewed by the left eye on even scan lines and pixels to be viewed by the right eye on odd scan lines; and
   displaying pixels to be viewed by the left eye on odd scan lines and pixels to be viewed by the right eye on even scan lines.

13. Method of claim 11, wherein the step of being inputted with a frame or field is a step of being inputted with a field, and the inputted field is an interlaced scan field.

14. Method of claim 11, wherein the step of being inputted with a frame or field is a step of being inputted with a frame, and the inputted frame is a progressive scan frame.

15. Method for processing stereoscopic video data formatted into a succession of frames or fields and for displaying the processed stereoscopic video data on a video display device suitable for use with active glasses, the video display device being here referred to as active monitor, the method including
   being inputted with a frame or field, wherein the frame or field includes pixels and each of the pixels is associated with color data; and
   displaying, on the active monitor,
   in a first frame, pixels to be viewed by the left eye of a user bearing active glasses suitable for use with the active monitor; and
   in a second frame, either following or preceding the first frame, pixels to be viewed by the right eye of the user, wherein each of the displayed pixels is associated with color data;

wherein the color data associated with the displayed pixels to be viewed by the left eye are derived from one part of the inputted frame or field, that part being referred to here as input left eye part, wherein the input left eye part comprises less than all pixels of the inputted frame or field;

the color data associated with the displayed pixels to be viewed by the right eye are derived from another part of the inputted frame or field, that part being referred to here as input right eye part, wherein the input right eye part comprises less than all pixels of the inputted frame or field; and referring, in the first frame, in sequence from the leftmost, uppermost pixel to the rightmost, lowermost pixel, to the displayed pixels to be viewed by the left eye as pixels $DL_i$, wherein i is an integer with $1 \leq i \leq 2p$, referring, in the second frame, in sequence from the leftmost, uppermost pixel to the rightmost, lowermost pixel, to the displayed pixels to be viewed by the right eye as pixels $DR_i$, wherein i is an integer with $1 \leq i \leq 2p$, referring, in sequence from the leftmost, uppermost pixel to the rightmost, lowermost pixel, to the pixels of the input left eye part as pixels $InL_j$, wherein j is an integer with $1 \leq j \leq q$, referring, in sequence from the leftmost, uppermost pixel to the rightmost, lowermost pixel, to the pixels of the input right eye part as pixels $InR_j$, wherein j is an integer with $1 \leq j \leq q$, for at least some values of i, the color data associated with displayed pixel $DL_i$ is derived from the color data of one or more of pixels $InL_j$ in a different manner than the color data associated with displayed pixel $DR_i$ is derived from the color data of one or more of pixels $InR_j$, and wherein the input left eye part and the input right eye part do not overlap in the inputted frame or field.

16. Method of claim 15, wherein the step of being inputted with a frame or field is a step of being inputted with a field, and the inputted field is an interlaced scan field.

17. Method of claim 15, wherein the step of being inputted with a frame or field is a step of being inputted with a frame, and the inputted frame is a progressive scan frame.

18. System for processing stereoscopic video data for transmission, the system including an input unit configured for being inputted with a left-eye image and a right-eye image, wherein each of the left-eye image and the right-eye image includes pixels, and each of the pixels is associated with color data; and a multiplexing unit configured for multiplexing the left-eye image and the right-eye image into a single frame or field by associating, with each of a set of positions selected from the left-eye image and each of a set of positions selected from the right-eye image, color data, wherein the color data associated with a selected position is derived either from the color data of the pixel identified by the selected position or from the color data of a group of pixels centered on the selected position; and arranging the color data associated with the selected positions from the left-eye image and the color data associated with the selected positions from the right-eye image into the single frame or field;

the system being configured so that the set of positions selected from the left-eye image at least partially differs from the set of positions selected from the right-eye image, and so that less than all positions are selected from the left-eye image and less than all positions are selected from the right-eye image in forming the single frame or field.

19. System of claim 18, configured so that each of the pixels of the left-eye image and of the right-eye image is identified by a pair of coordinates, a pair of coordinates being here referred to as pixel address, and wherein each selected position is a pixel address.

20. System of claim 18, configured so that none of the positions selected from the left-eye image is the same as a position selected from the right-eye image.

21. System of claim 20, configured so that the set of positions selected from the left-eye image and the set of positions selected from the right-eye image include positions selected from within pixels from a first set of pixels rows from the left-eye image and positions selected from within pixels from a second set of pixels rows from the right-eye image, wherein none of the rows of the first set is that same as a row of the second set.

22. System of claim 21, configured so that the set of positions selected from the left-eye image and the set of positions selected from the right-eye image include one of:

a set of positions selected from within pixels from the even scan lines of the left-eye image and a set of positions selected from within pixels from the odd scan lines of the right-eye image; and a set of positions selected from within pixels from the odd scan lines of the left-eye image and a set of positions selected from within pixels from the even scan lines of the right-eye image.

23. System of claim 22, configured so that the set of positions selected from the left-eye image and the set of positions selected from the right-eye image include one of:

a set of positions selected from half of the pixels from the even scan lines of the left-eye image and a set of positions selected from half of the pixels from the odd scan lines of the right-eye image; and a set of positions selected from half of the pixels from the odd scan lines of the left-eye image and a set of positions selected from half of the pixels from the even scan lines of the right-eye image.

24. System of claim 22, configured so that the set of positions selected from the left-eye image and the set of positions selected from the right-eye image include one of:

a set of positions selected from all the pixels from the even scan lines of the left-eye image and a set of positions selected from all the pixels of the odd scan lines from the right-eye image; and a set of positions selected from all the pixels from the odd scan lines of the left-eye image and a set of positions selected from all the pixels from the even scan lines of the right-eye image.

25. System according to claim 18, configured so that the left-eye image and the right-eye image are multiplexed into a single field, and the single field is an interlaced scan field.

26. System according to claim 18, configured so that the left-eye image and the right-eye image are multiplexed into a single frame, and the single frame is a progressive scan frame.

27. System according to claim 18, configured so that arranging the color data associated with the selected positions from the left-eye image and the color data associated with the selected positions from the right-eye image into the single frame or field is carried out in any one of a side-by-side manner, a top-bottom manner, a line-by-line manner, and a checkerboard manner.

28. System for processing stereoscopic video data formatted into a succession of frames or fields and for displaying the processed stereoscopic video data on a video display device suitable for use with passive glasses, the video display device being here referred to as passive monitor, the system including an input unit configured for being inputted with a frame or field, wherein the frame or field includes pixels and each of the pixels is associated with color data; and a displaying unit configured for displaying simultaneously, on the passive monitor, pixels to be viewed by the left eye and pixels to be viewed by the right eye of a user bearing passive glasses suitable for use with the passive monitor, wherein each of the displayed pixels is associated with color data;

the system being configured so that the color data associated with the displayed pixels to be viewed by the left eye are derived from one part of the inputted frame or field, that part being referred to here as input left eye part, wherein the input left eye part comprises less than all pixels of the inputted frame or field;

the color data associated with the displayed pixels to be viewed by the right eye are derived from another part of the inputted frame or field, that part being referred to here as input right eye part, wherein the input right eye part comprises less than all pixels of the inputted frame or field; and referring, in sequence from the leftmost, uppermost pixel to the rightmost, lowermost pixel, to the displayed pixels to be viewed by the left eye as pixels $DL_i$, wherein i is an integer with $1 \leq i \leq p$, referring, in sequence from the leftmost, uppermost pixel to the rightmost, lowermost pixel, to the displayed pixels to be viewed by the right eye as pixels $DR_i$, wherein i is an integer with $1 \leq i \leq p$, referring, in sequence from the leftmost, uppermost pixel to the rightmost, lowermost pixel, to the pixels of the input left eye part as pixels $InL_j$, wherein j is an integer with $1 \leq j \leq q$, referring, in sequence from the leftmost, uppermost pixel to the rightmost, lowermost pixel, to the pixels of the input right eye part as pixels $InR_j$ wherein j is an integer with $1 \leq j \leq q$, for at least some values of i, the color data associated with displayed pixel $DL_i$ is derived from the color data of one or more of pixels $InL_j$ in the same manner as the color data associated with displayed pixel $DR_i$ is derived from the color data of one or more of pixels $InR_j$, and wherein the input left eye part and the input right eye part do not overlap in the inputted frame or field.

29. System of claim 28, configured so that displaying simultaneously, on the passive monitor, pixels to be viewed by the left eye and pixels to be viewed by the right eye of a user bearing passive glasses suitable for use with the passive monitor includes one of:

displaying pixels to be viewed by the left eye on even scan lines and pixels to be viewed by the right eye on odd scan lines; and displaying pixels to be viewed by the left eye on odd scan lines and pixels to be viewed by the right eye on even scan lines.

30. System of claim 28, wherein the input unit is configured for being inputted with a field, and the inputted field is an interlaced scan field.

31. System of claim 28, wherein the input unit is configured for being inputted with a frame, and the inputted frame is a progressive scan frame.

32. System for processing stereoscopic video data formatted into a succession of frames or fields and for displaying the processed stereoscopic video data on a video display device suitable for use with active glasses, the video display device being here referred to as active monitor, the system including an input unit configured for being inputted with a frame or field, wherein the frame or field includes pixels and each of the pixels is associated with color data; and a displaying unit configured for displaying, on the active monitor, in a first frame, pixels to be viewed by the left eye of a user bearing active glasses suitable for use with the active monitor; and in a second frame, either following or preceding the first frame, pixels to be viewed by the right eye of the user, wherein each of the displayed pixels is associated with color data;

the system being configured so that the color data associated with the displayed pixels to be viewed by the left eye are derived from one part of the inputted frame or field, that part being referred to here as input left eye part, wherein the input left eye part comprises less than all pixels of the inputted frame or field;

the color data associated with the displayed pixels to be viewed by the right eye are derived from another part of the inputted frame or field, that part being referred to here as input right eye part, wherein the input right eye part comprises less than all pixels of the inputted frame or field; and referring, in the first frame, in sequence from the leftmost, uppermost pixel to the rightmost, lowermost pixel, to the displayed pixels to be viewed by the left eye as pixels $DL_i$, wherein i is an integer with $1 \leq i \leq 2p$, referring, in the second frame, in sequence from the leftmost, uppermost pixel to the rightmost, lowermost pixel, to the displayed pixels to be viewed by the right eye as pixels $DR_i$, wherein i is an integer with $1 \leq i \leq 2p$, referring, in sequence from the leftmost, uppermost pixel to the rightmost, lowermost pixel, to the pixels of the input left eye part as pixels $InL_j$, wherein j is an integer with $1 \leq j \leq q$, referring, in sequence from the leftmost, uppermost pixel to the rightmost, lowermost pixel, to the pixels of the input right eye part as pixels $InR_j$, wherein j is an integer with $1 \leq j \leq q$, for at least some values of i, the color data associated with displayed pixel $DL_i$ is derived from the color data of one or more of pixels $InL_j$ in a different manner than the color data associated with displayed pixel $DR_i$ is derived from the color data of one or more of pixels $InR_j$, and wherein the input left eye part and the input right eye part do not overlap in the inputted frame or field.

33. System of claim 32, wherein the input unit is configured for being inputted with a field, and the inputted field is an interlaced scan field.

34. System of claim 32, wherein the input unit is configured for being inputted with a frame, and the inputted frame is a progressive scan frame.

35. Non-transitory computer-readable storage medium including computer-understandable instructions configured, when executed on a computer, to carry out the method according to claim 1.

* * * * *